(12) United States Patent
Genda et al.

(10) Patent No.: US 7,529,539 B2
(45) Date of Patent: May 5, 2009

(54) SECURITY SYSTEM

(75) Inventors: Takahiro Genda, Tokyo (JP); Shiro Takatsuto, Tokyo (JP); Osamu Nakahashi, Tokyo (JP); Kimio Ueno, Tokyo (JP)

(73) Assignee: NEC Corporation (JP)

( * ) Notice: Subject to any disclaimer, the term of this patent is extended or adjusted under 35 U.S.C. 154(b) by 581 days.

(21) Appl. No.: 11/284,398

(22) Filed: Nov. 18, 2005

(65) Prior Publication Data

US 2006/0109101 A1  May 25, 2006

(30) Foreign Application Priority Data

Nov. 19, 2004  (JP)  ............... 2004-336038

(51) Int. Cl.
*G08B 19/00* (2006.01)
(52) U.S. Cl. ................. 455/411; 711/151; 340/521
(58) Field of Classification Search ........... 711/102, 711/151, 163, 164; 713/2, 183; 340/521, 340/531
See application file for complete search history.

(56) References Cited

U.S. PATENT DOCUMENTS

2005/0124318 A1 * 6/2005 Jeon ................ 455/411

FOREIGN PATENT DOCUMENTS

| JP | 7-193865 | 7/1995 |
|---|---|---|
| JP | H 09-215057 | 8/1997 |
| JP | 2004-159121 | 9/2001 |
| JP | 2003-070070 | 3/2003 |
| JP | H 11-098244 | 6/2004 |
| JP | 2004-268216 | 7/2004 |
| JP | 2004-260344 | 9/2004 |

OTHER PUBLICATIONS

English Translation of Japanese Office Action relating to Application No. JP 2004-336038 dated May 16, 2008.

* cited by examiner

*Primary Examiner*—Sam Bhattacharya
(74) *Attorney, Agent, or Firm*—Ostrolenk, Faber Gerb & Soffen, LLP

(57) ABSTRACT

A security system is provided, which can protect information within a mobile phone terminal when the mobile phone terminal is lost or stolen. The security system comprises an ASP to protect information on the mobile phone terminal having information storage unit to store information, and the ASP includes an instruction accepting unit to accept a protection instruction to protect information from a user of the mobile phone terminal and a cancellation instruction to cancel the protection of the information, an authentication unit to certify the user of the mobile phone terminal, and an instruction exhibiting unit to notify a portable communication terminal of the protection instruction and the cancellation instruction when the authentication unit authenticate the user, and the mobile phone terminal includes an instruction referring unit to receive the protection instruction and the cancellation instruction from the ASP, a protecting unit to perform a process of protecting the information according to the protection instruction and a canceling unit to perform a process of canceling the protection of the information according to the cancellation instruction.

22 Claims, 18 Drawing Sheets

F I G. 2
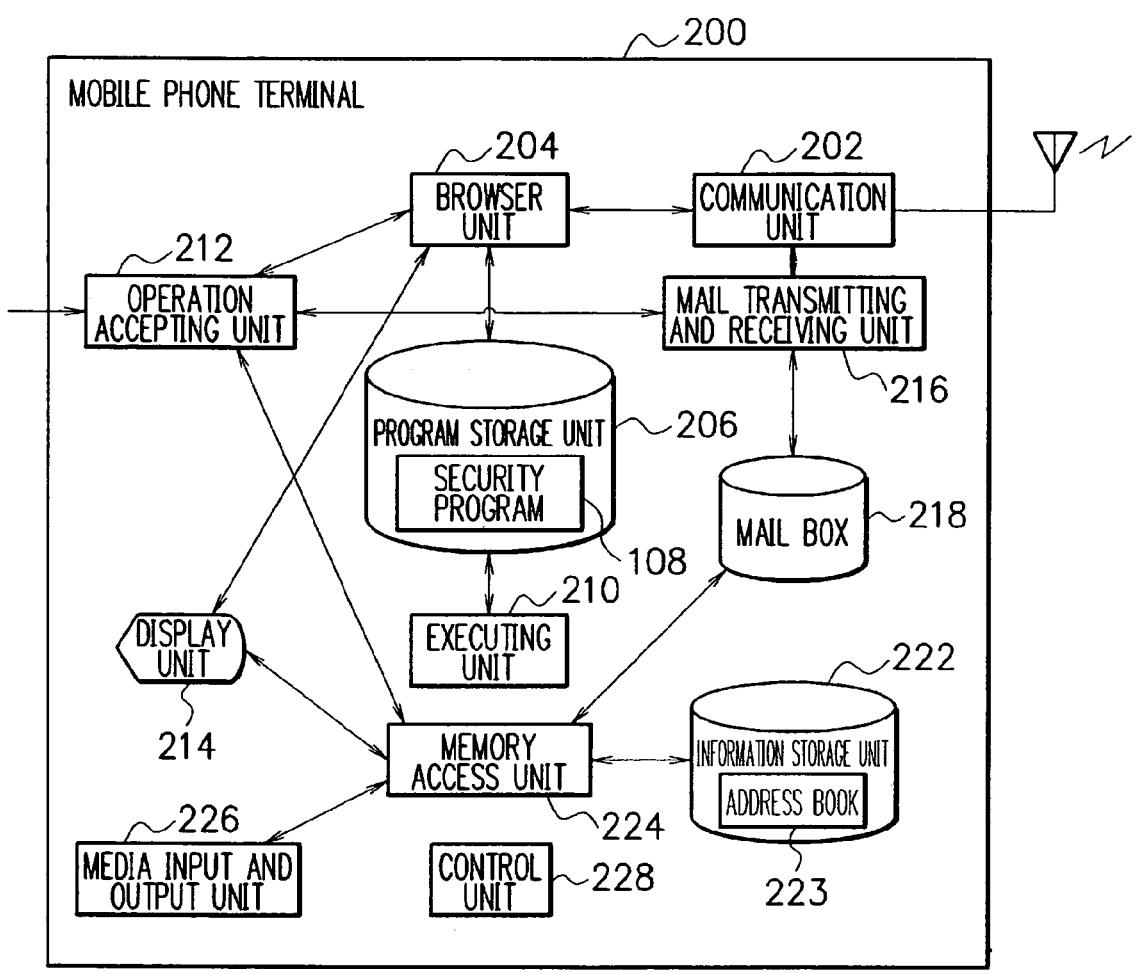

FIG. 4

122 USER INFORMATION TABLE

| USER ID | PASSWORD | PROCESS FLAG |
|---|---|---|
| 090-xxxx-xxxx | ****** | 1 |
| 080-xxxx-xxxx | ****** | 0 |
| 090-xxxx-xxxx | ****** | 0 |
| ⋮ | ⋮ | ⋮ |

FIG. 5

132 USER INFORMATION TABLE

| USER ID | PASSWORD | LEVEL 1 PROCESS FLAG | LEVEL 2 PROCESS FLAG |
|---|---|---|---|
| 090-xxxx-xxxx | ****** | 1 | 0 |
| 080-xxxx-xxxx | ****** | 0 | 1 |
| 090-xxxx-xxxx | ****** | 0 | 0 |
| ⋮ | ⋮ | ⋮ | ⋮ |

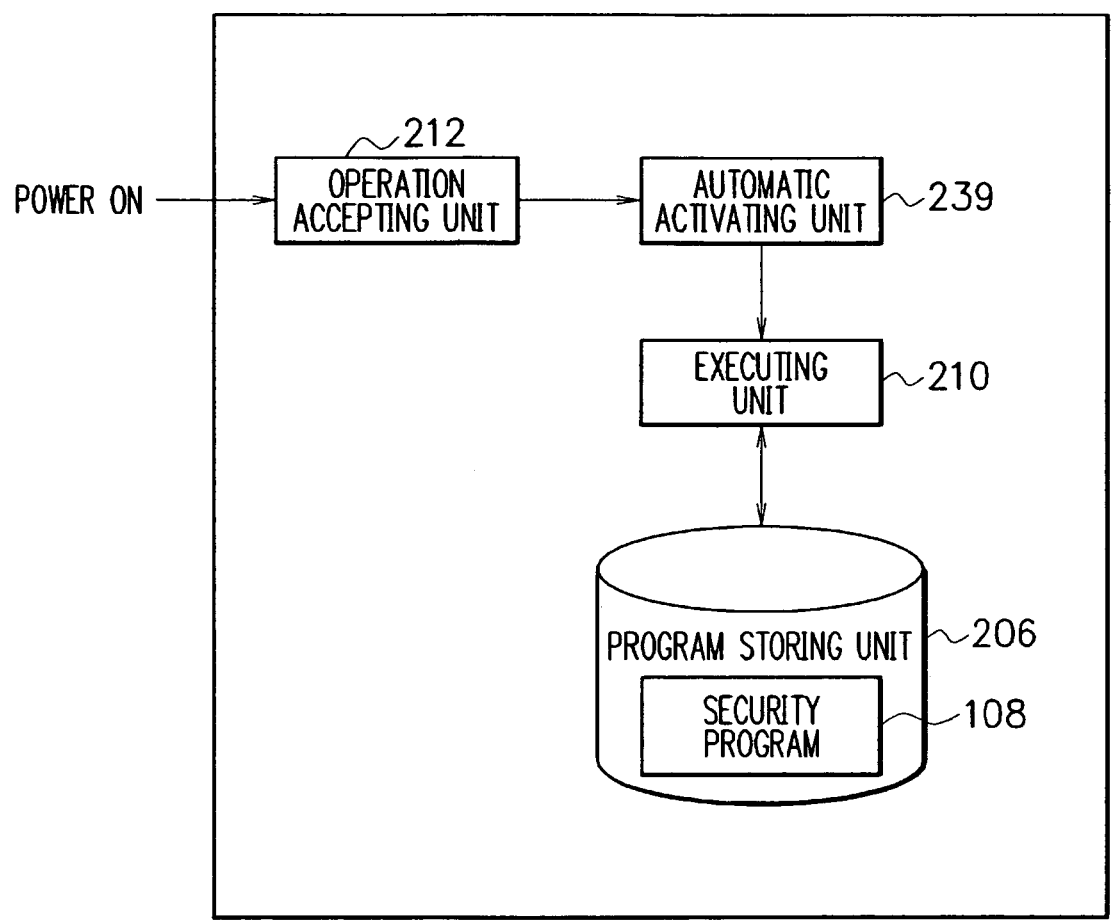
F I G. 6

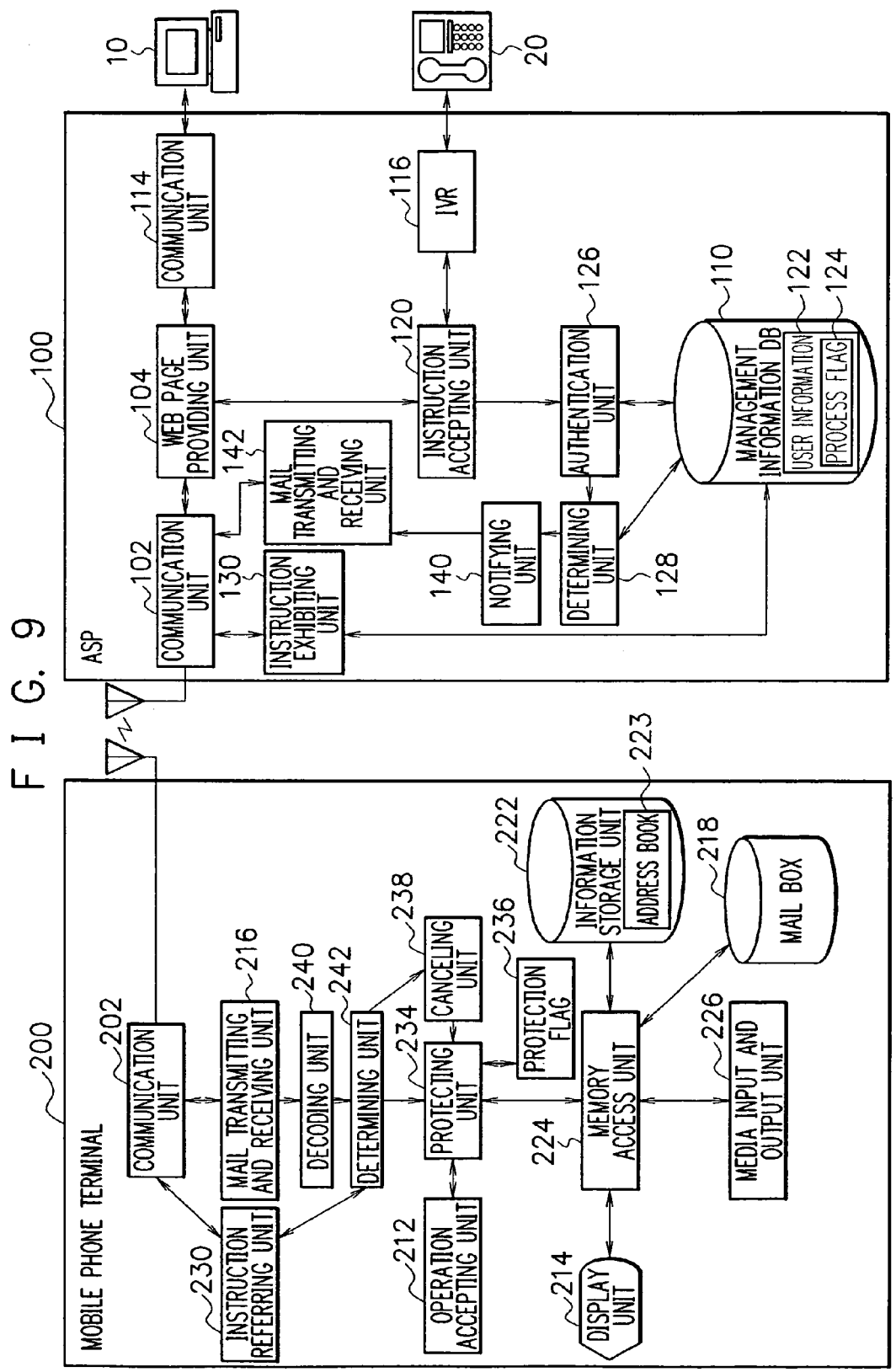
F I G. 9

F I G. 10
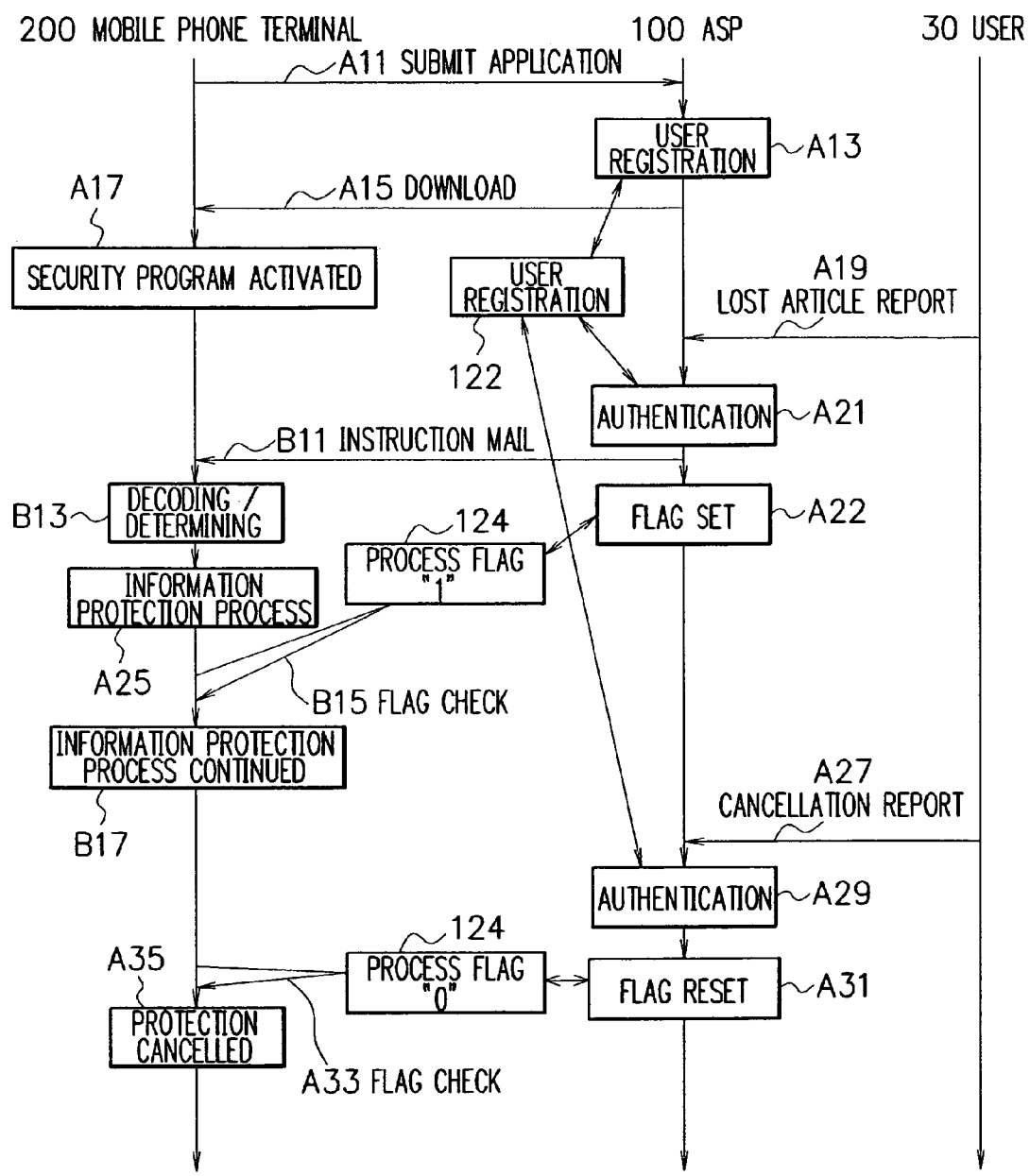

FIG. 11
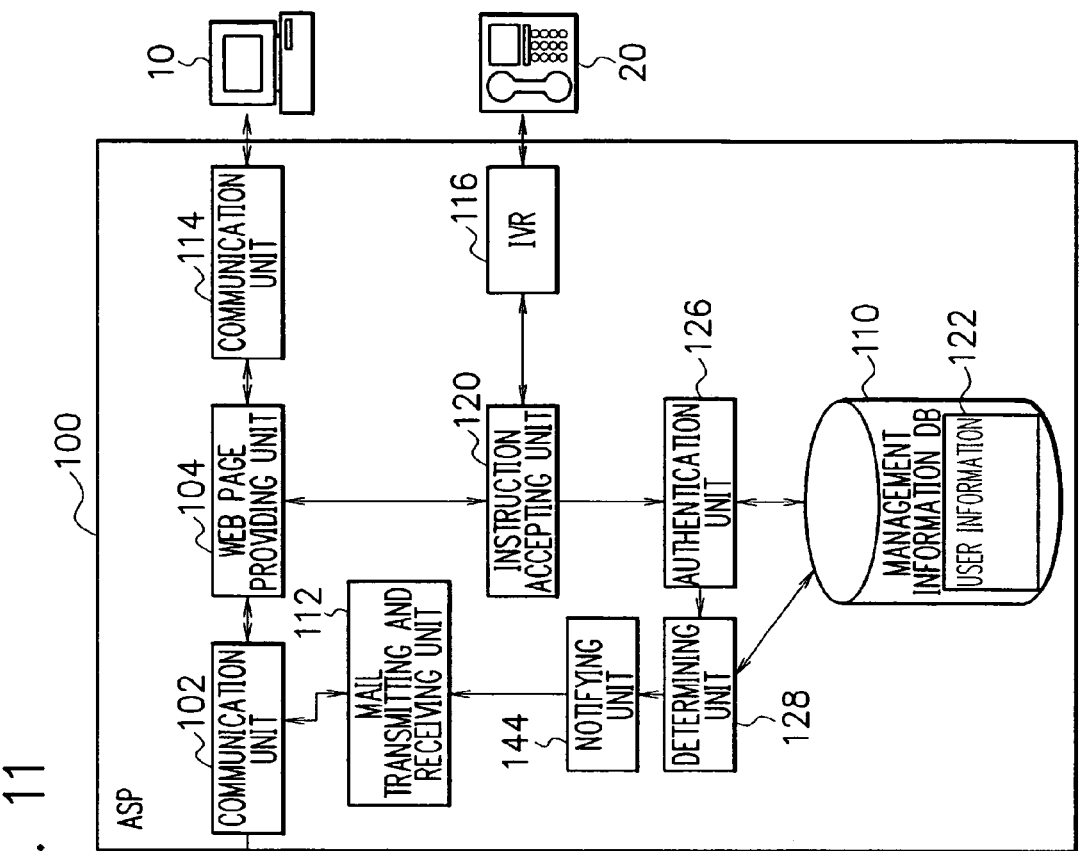
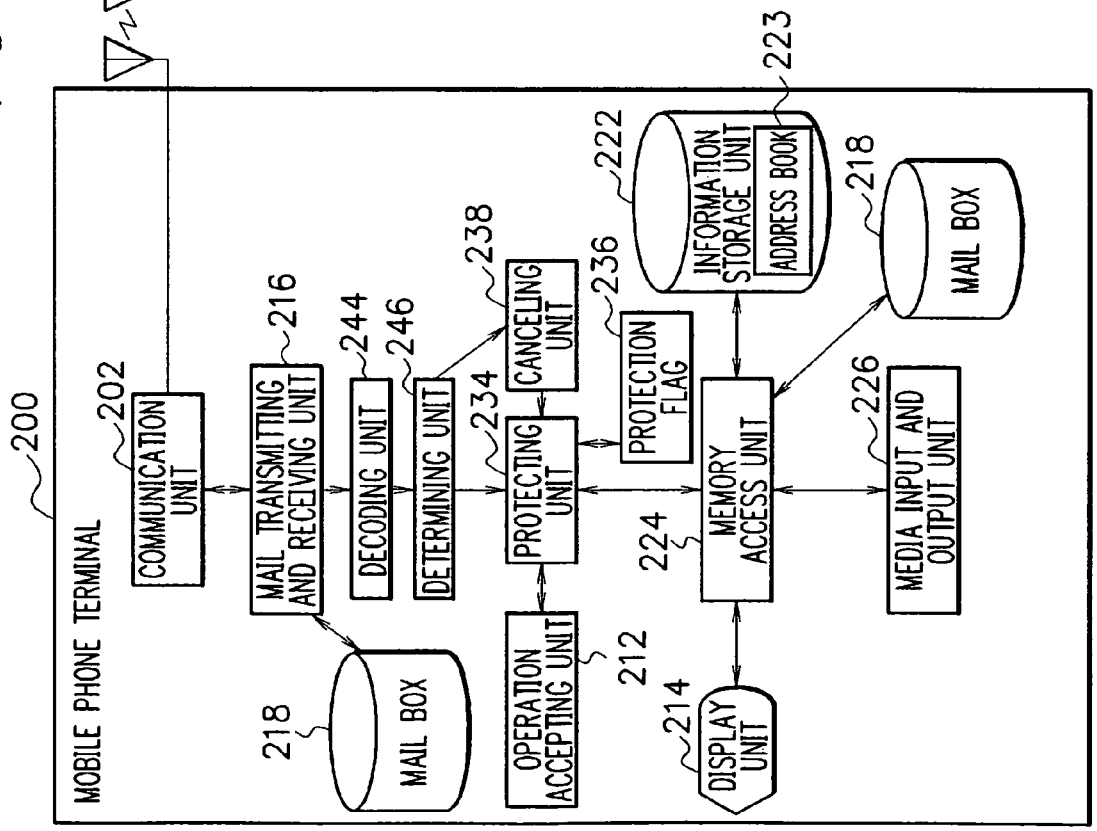

F I G. 12
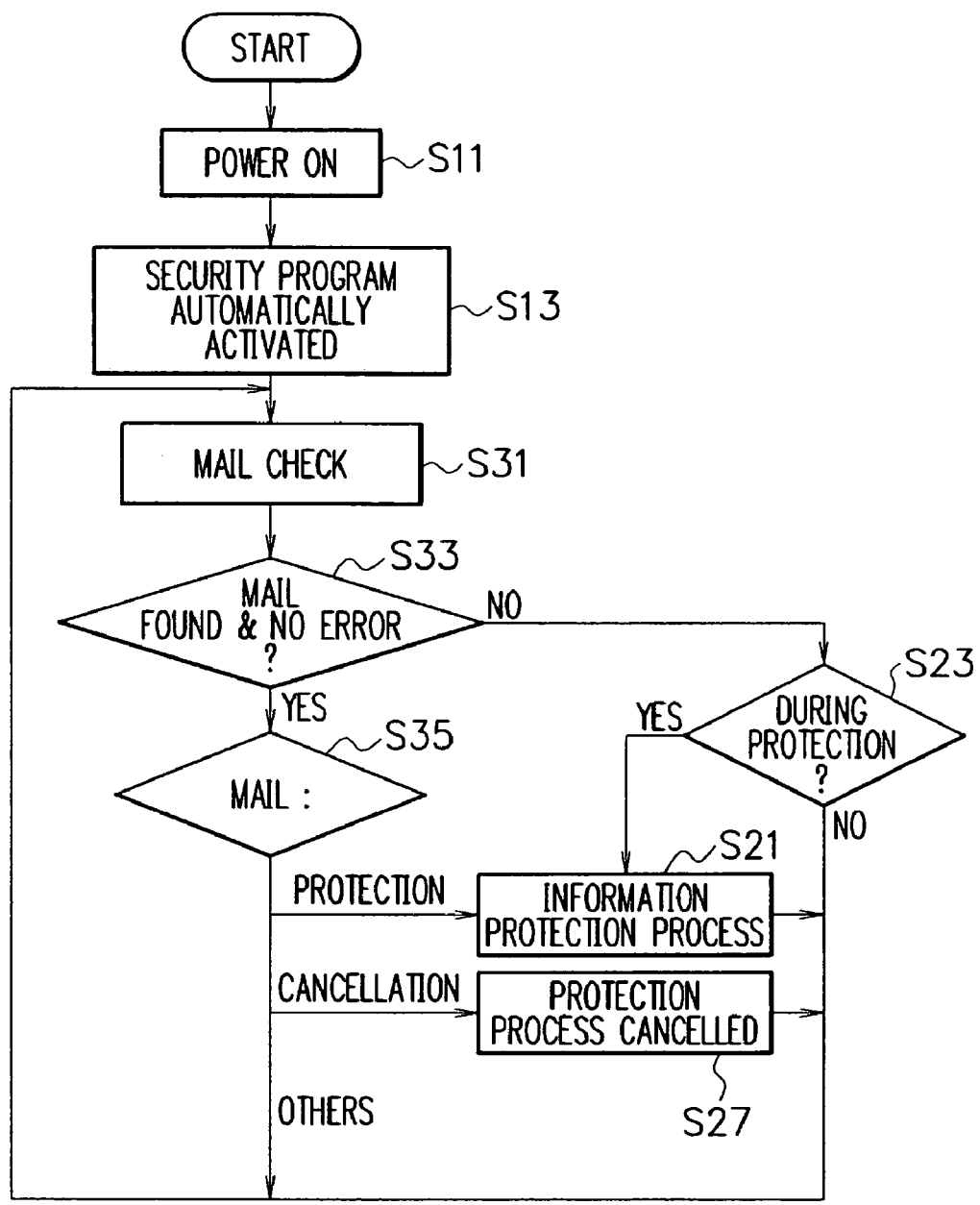

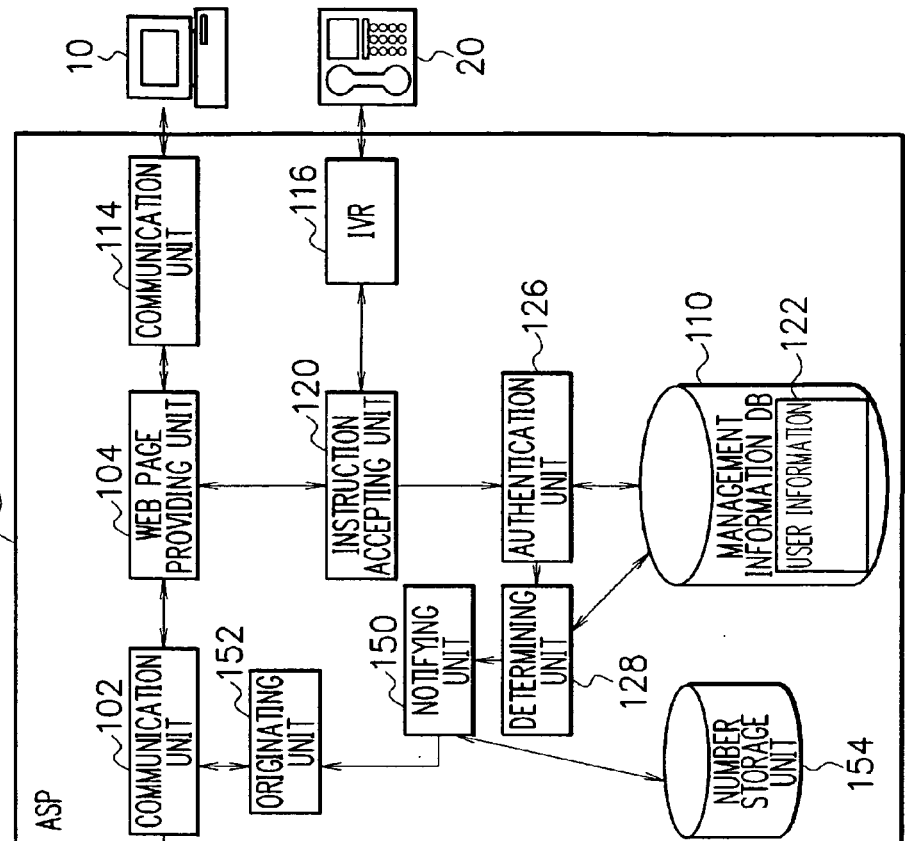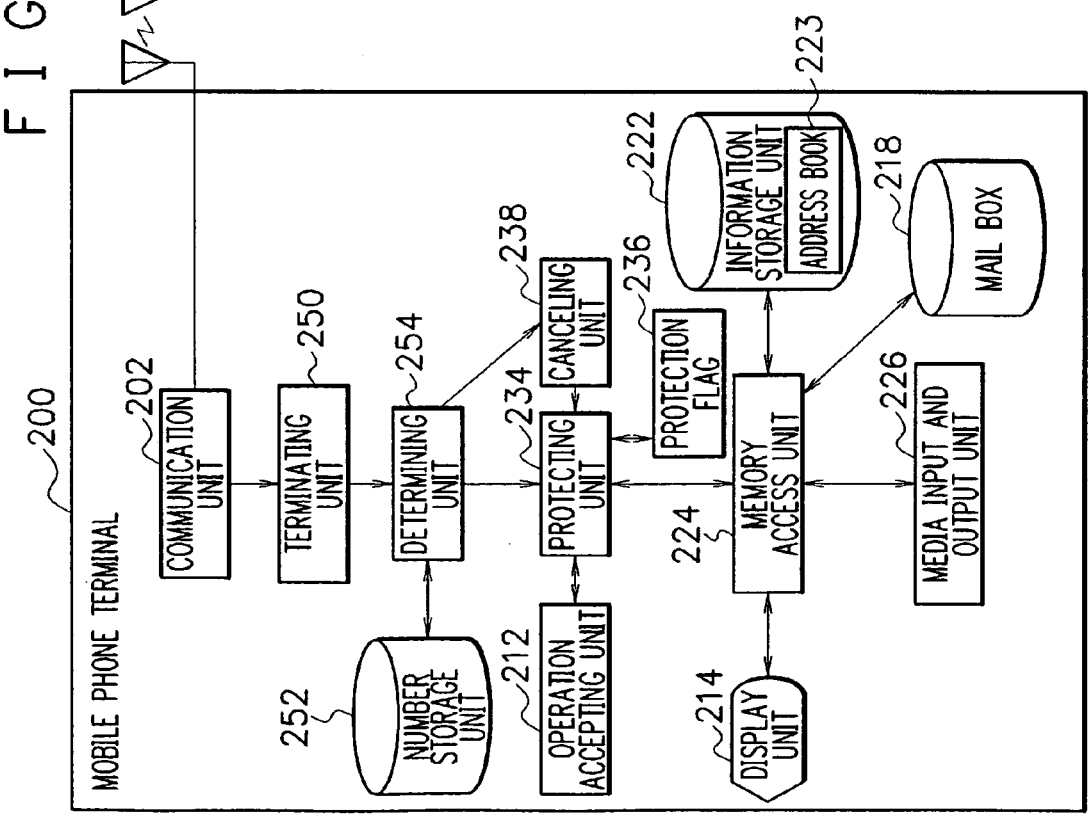
FIG. 14

156 ORIGINATING CALL NUMBER TABLE

| NOTIFICATION | ORIGINATING CALL NUMBER |
|---|---|
| PROTECTION | xxx-xxx-1111 |
| CANCELLATION | xxx-xxx-9999 |

(b)

256 CALLED NUMBER TABLE

| CALLED NUMBER | NOTIFICATION |
|---|---|
| xxx-xxx-1111 | PROTECTION |
| xxx-xxx-9999 | CANCELLATION |

180 ORIGINATING CALL NUMBER TABLE

| NOTIFICATION | ORIGINATING CALL NUMBER |
|---|---|
| PROTECTION LEVEL 1 | xxx-xxx-1111 |
| PROTECTION LEVEL 2 | xxx-xxx-2222 |
| CANCELLATION | xxx-xxx-9999 |

(b)

260 CALLED NUMBER TABLE

| CALLED NUMBER | NOTIFICATION |
|---|---|
| xxx-xxx-1111 | PROTECTION LEVEL 1 |
| xxx-xxx-2222 | PROTECTION LEVEL 2 |
| xxx-xxx-9999 | CANCELLATION |

SECURITY SYSTEM

BACKGROUND OF THE INVENTION

1. Field of the Invention

The present invention relates to a security system, and in particular, it relates to a security system for protecting information within a portable communication terminal when the portable communication terminal is stolen or lost.

2. Description of Related Art

As a security system for a conventional portable communication terminal, for example, there is a system disclosed in Japanese Patent Application Laid-Open No. HEI 07-193865. The security system of the mobile phone terminal disclosed in the document uses a password, and the data desired to be protected by the user is associated with the password, and an access to the data can be made only when the password is inputted. In this manner, the primary user who decides the password can make an access to the data, and the person who illegally takes possession of the terminal is unable to access to the data.

SUMMARY OF THE INVENTION

However, the prior art disclosed in the above patent document has room for improvement on the following points.

In the first place, since the password is useless unless the user who has decided the password remembers it, it is often related to the user, or becomes short and easy to remember. Hence, when a user who is illegitimate acquires this terminal, there is a possibility that the password would be traced down by trial and error.

In the second place, in case the user does not set up a password at all, the prior art does not exert its effect completely.

The present invention has been made in view of the above situation, and an object of the invention is to provide a security system capable of protecting information within a portable communication terminal the portable communication terminal is stolen or lost.

According to the present invention, a security system comprising a control device to protect the information in the portable communication terminal comprising information storage unit to store information is provided, wherein the control device comprises: a user instruction accepting unit to accept a protection instruction to protect the information from the user of the portable communication terminal and a cancellation instruction to cancel the protection of the information; a authenticating unit for authenticating the user of the portable communication terminal; an instruction notifying unit to notify the portable communication terminal of the protection instruction and the cancellation instruction when the authenticating unit authenticates the user; and a providing unit to provide a security program to protect the information on the portable communication terminal, and wherein the portable communication terminal includes: a receiving unit to receive the protection instruction and the cancellation instruction from the control device; an information protecting unit to perform a process of protecting the information according to the protection instruction received by the receiving unit; a protection canceling unit to perform a process of canceling the protection of the information according to the cancellation instruction received by the receiving unit; a downloading unit to download the security program from the control device through an Internet; a program storage unit to store the security program downloaded by the downloading unit; and an executing unit to execute the security program when the portable communication terminal is activated.

Here, the portable communication terminal includes, for example, various types of information terminals that is capable of wireless communications and portable such as a mobile phone, PDA, a pager, a note type personal computer, and the like. Further, the user instruction accepting unit accepts a burglary and lost article report and a cancellation report thereof and the like from the user of the portable communication terminal from the terminal such as a telephone and a personal computer. In case the burglary and lost article report is issued from the user, the user instruction accepting unit accepts the protection instruction to perform a process of protecting the information in the portable communication terminal. On the other hand, in case the portable communication terminal is returned to the user, and the cancellation report is issued from the user, the user instruction accepting unit accepts the cancellation instruction to perform a process of a canceling the protection of the information in the portable communication terminal.

Further, the control unit performs communications with the portable communication terminal through the Internet or a wireless or wired telephone line, so that the protection instruction and the cancellation instruction can be notified. Further, the providing unit is a so-called ASP (Application Service Provider), and the portable communication terminal downloads the security program from the ASP and executes the program. In this manner, through the association of the ASP and the security program, the information protection process of the portable communication terminal can be remotely performed.

According to the present invention, it is possible to protect the information in the portable communication terminal when the portable communication terminal is lost or robbed.

In the above described security system, the control device can comprise a flag storage unit to coordinate and store identification information on the portable communication terminal and a process flag showing whether or not a process of protecting the information is performed, and the instruction notifying unit of the control device can set and reset the process flag of the identification information on the portable communication terminal of the flag storage unit when the instruction notifying unit notifies the portable communication terminal of the protection instruction and the cancellation instruction, and the portable communication terminal accesses to the flag storage unit of the control device through the Internet, and can include a reference unit to refer to the process flag corresponding to own identification information and the control unit in which when the process flag is set, the information protecting unit is allowed to perform a process of protecting the information, and when the process flag is reset, the protection canceling unit is allowed to perform a process of canceling the protection of the information.

Here, the identification information on the portable communication terminal is, for example, the phone number and the like of the mobile phone. The ASP accepts an application for use of the security program from the user of the portable communication terminal, and performs user registration.

According to this constitution, since it can determine whether or not the information protection process should be performed by periodically accessing to the ASP from the mobile phone terminal, it is possible to remotely protect the information in the mobile phone terminal.

In the above described security system, the control device can include an application accepting unit to accept a use application of the security program from the portable communication terminal, a registration accepting unit to accept the registration of the identification information and the password on the portable communication terminal when the application accepting unit accepts the application, and a registration terminal storage unit to coordinate and store the password for every identification information on the portable communication terminal accepted by the registration accepting unit, and in the control device, the user instruction accepting unit can accept the protection instruction and the cancellation instruction together with the identification information and the password on the portable communication terminal, and the authenticating unit accesses to the registration terminal storage unit and determines whether or not the identification information and the password of the portable communication terminal accepted by the user instruction accepting unit are matched, and when matched, can authenticate the user of the portable communication terminal.

According to this constitution, through the execution of the user authentication, the illegal information protection process and cancellation of the protecting process of the mobile phone terminal can be protected, thereby enhancing the security of the present system.

In the above described security system, the control device can include an originating unit to transmit a protection instruction mail to the portable communication terminal, and the portable communication terminal can include the receiving unit to receive the protection instruction mail, and the information protecting unit of the portable communication terminal starts a process of protecting the information when the receiving unit receives the protection instruction mail, and at the same time, after that, the reference unit can periodically refer to the process flag.

According to this constitution, at the normal using time, since the process flag is periodically checked, there is no need to access to the ASP, and therefore, the number of communications with the ASP can be sharply reduced. Further, the portable communication terminal receives the protection instruction mail, so that the process of quickly protecting the information can be started, thereby increasing the reliability of the system.

In the above described security system, the control device can include the originating unit to transmit the cancellation instruction mail to the portable communication terminal, and the portable communication terminal can include the receiving unit to receive the cancellation instruction mail, and the protection canceling unit of the portable communication terminal can perform the process of canceling the protection of the information when the receiving unit receives the cancellation instruction mail.

According to this constitution, after performing the protection process, the process flag is periodically checked, and therefore, there is no need to access to the ASP, and the number of communications with the ASP can be remarkably reduced.

In the above described security system, the portable communication terminal refers to the protection instruction mail or the title or the text of the cancellation instruction mail received by the receiving unit, and can include a determining unit to determine whether or not the mail is a mail to notify the protection instruction or the cancellation instruction, and the information protecting unit performs the process of protecting the information when it is determined that the mail is a mail to notify the protection instruction by the determining unit, and the protection canceling unit can perform the process of canceling the protection of the information when it is determined that the mail is a mail to notify the cancellation instruction by the determining unit.

According to this constitution, the protection process and protection cancellation of the information in the mobile phone terminal can be performed by the protection instruction or cancellation instruction mail.

In the above described securing system, the user instruction accepting unit receives a call from the user of the portable communication terminal through the public circuit network, and can include a voice automatic response device to perform an automatic voice response, and the voice automatic response device can accept the protection instruction and the cancellation instruction of the portable communication terminal together with the identification information and password on the portable communication terminal.

Here, the voice automatic response device is a so-called IVR (Interactive Voice Response), and is a computer system performing an automatic response by voice. According to the dial operation of the sender, the voice guidance recorded in advance is automatically reproduced for the sender. Alternatively, the device is a speech recognition unit to recognize the speech of the sender, which can reproduce the speech according to the speech content recognized.

According to this constitution, it is possible to receive the burglary and lost article report and the cancellation report from the user through the telephone line, and even in case the connection to the security system from the communication terminal and the like through the Internet is unable to be made, the burglary and lost article report can be received.

In the above described security system, the user instruction unit accepting unit can accept the input of the identification information and the password of the portable communication terminal together with the protection instruction and the cancellation instruction of the portable communication terminal from the user of the portable communication terminal through the Internet.

According to this constitution, it is possible to receive the burglary and lost article report from the user through the Internet, and even in case the connection by the telephone line is unable to be connected, the burglary and lost article report can be received.

In the above described security system, the portable communication terminal comprises an operating unit to operate the information, and the information protecting unit of the portable communication terminal can comprise an operation prohibiting unit to prohibit the operation of the operating unit of the portable communication terminal, and the protection canceling unit of the portable communication terminal can comprise a prohibition canceling unit to cancel the operation prohibition of the operating unit of the portable communication terminal.

In the above described security system, the portable communication terminal can comprise a shutting off unit to automatically shut off the power supply of the portable communication terminal, and the information protecting unit of the portable communication terminal can allow the shutting off unit of the portable communication terminal to automatically shut off the power supply.

In the above described security system, the information protecting unit of the mobile phone terminal performs plural protection processes to protect the information, and the user instruction accepting unit of the control device accept which protection process should be performed from plural protection processes, and the information protecting unit of the mobile phone terminal can perform the protection process accepted by the user instruction accepting unit of the control unit.

In the above described security system, the control device can include the originating unit to make a phone call from the predetermined phone number to the portable communication terminal when the user instruction accepting unit receives the protection instruction, and the portable communication terminal can include a number storage unit to store the predetermined phone number, a terminating unit to receive the phone number, an acquiring unit to acquire the phone number received by the terminating unit, and a determining unit to access to the number storage unit and determine whether or not the phone number acquired by the acquiring means is the predetermined phone number, and when the determining unit determines that the phone number acquired by the obtaining unit is the predetermined telephone number, the information protecting unit of the portable communication terminal can cancel the process of protecting the information.

According to this constitution, with a call incoming from the predetermined phone number recorded in advance acting as a trigger, it is possible to perform the process of protecting the information in the portable communication terminal. Consequently, even if the portable communication terminal is in a status in which the connection with the Internet is made not possible, if the phone line is available, it is possible to protect the information.

In the above described security system, the control device can include an originating unit to make a phone call from the predetermined phone number to the portable communication terminal when the user instruction accepting unit accepts the cancellation instruction, and the portable communication terminal can include a number storage unit to store the predetermined phone number, a terminating unit to receive a call, an obtaining unit to acquire the phone number received by the terminating unit, and a determining unit to determine whether or not the phone number acquired by the obtaining unit is the predetermined number, and when the determining unit determines that the phone number acquired by the obtaining unit is the predetermined phone number, the protection canceling unit of the portable communication terminal can cancel the process of the protection.

According to this constitution, with the call incoming from the predetermined phone number acting as a trigger, it is possible to cancel the process of protecting the information on the portable communication terminal. Consequently, even in case the portable communication terminal is in a status in which the connection with the Internet is made not possible, if the phone line is available, it is possible to cancel the protection of the information.

In the above described security system, the portable communication terminal can comprise a Web Browser, and the portable communication terminal can access to the control device through the Web Browser.

In the above described security system, the control device can include a protection process history recording unit to record the process history of the date and time when the user instruction unit have accepted the protection instruction and the cancellation instruction and a history providing unit to provide the process history recorded in the protection process history recording unit according to the request of the user.

According to this constitution, according to the request from the user, the protection process history showing that the information on the mobile phone terminal is protected can be exhibited, and therefore, the user who is uneasy without a mobile phone terminal can be relieved.

In the above described security system, the control device can include a charging unit to charge a charge for use to every user based on the process history recorded in the protection process history recording unit.

According to this constitution, a charge for using according to the use of the protection process service can be charged.

In the above described security system, the control device can include the charging unit to charge a charge for use to every user based on a contract history record of the date and time of the use application of the security system from the user accepted by the registration accepting unit and the data and time when the use has been cancelled, and the contract history recorded in the contract history recording unit.

According to this constitution, the service utilization charge can be charged according to a contract period.

A mode in which an arbitrary combination of the above described elements and the expression of the present invention are changed among the method, the device, the system, the recording medium, the computer program, and the like is also effective as the mode of the present invention.

According to the present invention, a security system is provided in which the information within the portable communication terminal can be protected when the portable communication terminal is stolen or lost.

BRIEF DESCRIPTION OF THE DRAWINGS

The objects and features of the present invention will become more apparent from the consideration of the following detailed description taken in conjunction with the accompanying drawings, in which:

FIG. 2 is a block diagram showing the constitution of a mobile phone terminal in the security system of FIG. 1;

FIG. 4 is a view showing an example of the constitution of the user information table of the management information database of the ASP of the security system of FIG. 3;

FIG. 5 is a view showing another example of the constitution of the user information table of the management information database of the ASP of the security system of FIG. 3;

FIG. 6 is a partial block diagram of the mobile phone terminal of the security system of FIG. 3;

FIG. 9 is a block diagram showing the constitution of the security system according to the embodiment of the present invention;

FIG. 10 is a flowchart showing an example of the operation of the security system of FIG. 9;

FIG. 11 is a block diagram showing the constitution of the securing system according to the embodiment of the present invention;

FIG. 12 is a flowchart showing an example of the operation of the mobile phone terminal of the security system of FIG. 11;

FIG. 14 is a block diagram showing the constitution of the security system according to the embodiment of the present invention;

FIG. 15 is a view showing an example of the constitution of the number storage unit of the ASP and the mobile phone terminal of the security system of FIG. 14;

FIG. 19 is a view showing another example of the constitution of the number storage unit of the ASP and the mobile phone terminal of the security system of the present invention.

DESCRIPTION OF THE PREFERRED EMBODIMENTS

Figure 1:
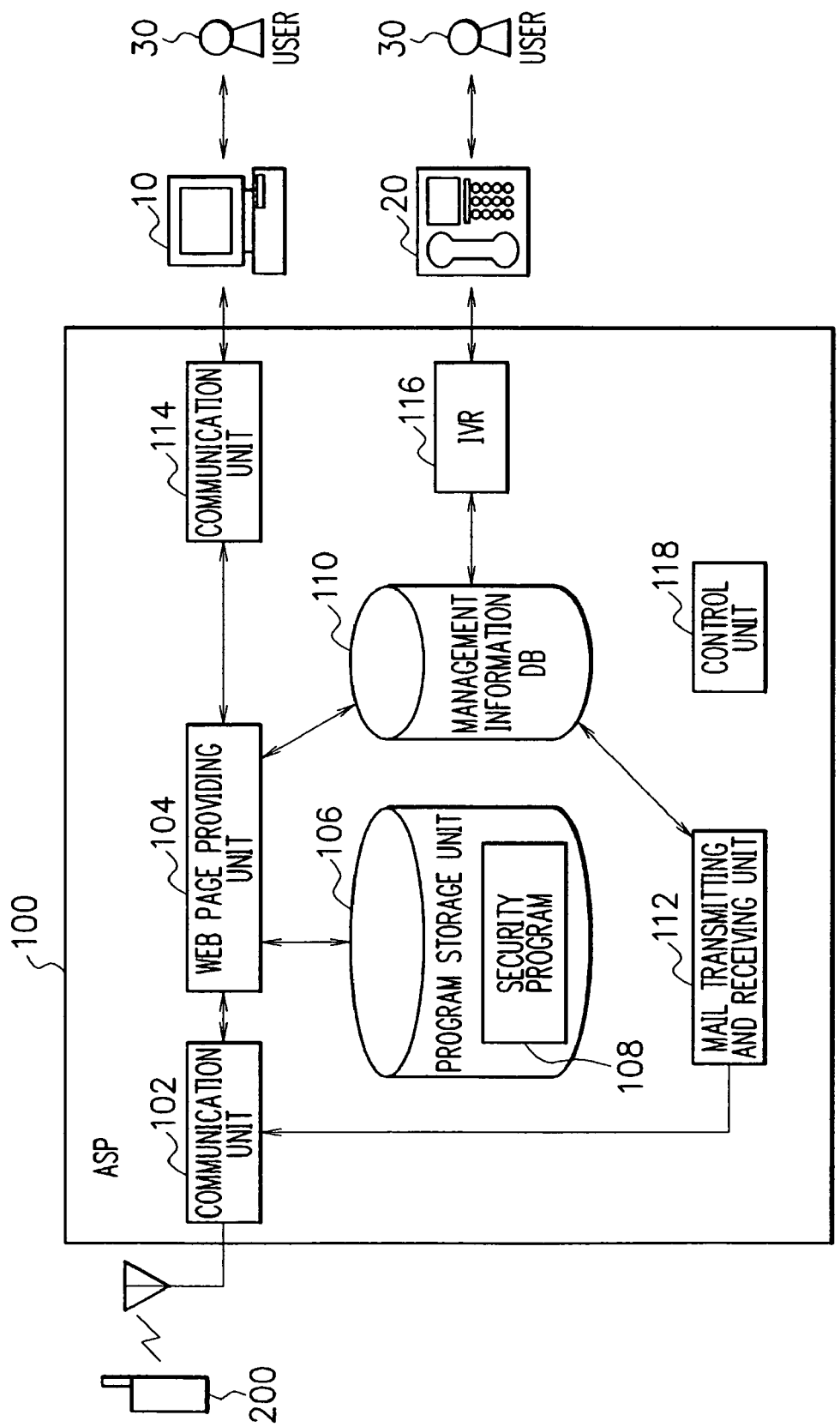
FIG. 1 is a block diagram showing the constitution of a security system according to the embodiment of the present invention.

The embodiments of the present invention will be described below by using the drawings. In all the figures, the same components will be accompanied with the same reference numerals, and the repetitive explanations thereof will be omitted.

First Embodiment

FIG. 1 is a block diagram showing a constitution of the security system according to the embodiment of the present invention. Each component of the security system is realized by the combination of software and hardware, mainly including a CPU of an arbitrary computer, a memory, a program realizing the components of the present figure loaded in the memory, a storage unit such as a hard disc and the like for storing the program, and an interface for network connection as a center. It will be appreciated by those skilled in the art that the realizing method and devices thereof include various modifications. Each figure to be described below shows not a constitution per hardware unit, but a block per functional unit. Further, in the following figures, the constitution of portions which has nothing to do with the essential of the present invention is omitted.

The security system of the present embodiment protects information in a mobile phone terminal 200 when the terminal is lost or stolen, and comprises an ASP 100.

The ASP 100, for example, provides various application software owned by the ASP 100 to the mobile phone terminal 200 having a Web Browser function. The mobile phone terminal 200 accesses to ASP 100 through the browser, and can activate and execute the application software owned by the ASP 100. Further, the ASP 100 is connectable to a communication terminal device 10 and a telephone set 20, and accepts enquiries and communications from a user 30. The detail of the mobile phone terminal 200 will be described later.

The ASP 100 includes a communication unit 102, a Web page providing unit 104, a program storage unit 106, a security program 108, a management information database (shown as "management information DB" in the figure) 110, a mail transmitting and receiving unit 112, a communication unit 114, an IVR 116, and a control unit 118.

The communication unit 102 performs a wireless communication with the mobile phone terminal 200. The Web page providing unit 104 provides Web pages accessed by terminals having a browser function, here, the mobile phone terminal 200 and the communication terminal device 10. The program storage unit 106 stores various application software owned by the ASP 100. In the present embodiment, the security program 108 is stored in the program storage unit 106. The security program 108 is downloaded to the mobile phone terminal 200, and is a program having a function to protect the information in the mobile phone terminal 200 in cooperation with the ASP 100.

The management information database 110 is a database in which various pieces of information on the user using the present securing system is stored. The mail transmitting and receiving unit 112 is a so-called mailer, and prepares and transmits mails to each mobile phone terminal 200 from the ASP 100, and at the same time, receives the mail transmitted from each mobile phone terminal 200. The communication unit 114 performs communications with the communication terminal device 10 through a network such as the Internet. It is possible to receive robbery and loss reports from the user 30 through the Internet at the communication unit 114, and even in case the connection through the telephone lines is not possible, robbery and loss reports can be received.

The IVR 116 is a voice automatic response device, and is a computer system to perform an automatic response by voice. In response to a dial operation of the sender who is the user 30, the voice guidance recorded in advance is automatically reproduced. Alternatively, the device may be a speech recognition unit to recognize the speech of the sender side and can reproduce the speech according to the recognized content. Even when the connection from the communication terminal device 10 and the like to the ASP 100 is not made possible through the Internet, the robber and loss report can be received at the IVR 116. The control unit 118 controls the entire device together with each element of the ASP 100. In FIG. 1, a control line from the control unit 118 is omitted.

FIG. 2 is a block diagram showing the constitution of the mobile phone terminal 200. The information in the terminal 200 is protected by the security system of FIG. 1.

The mobile phone terminal 200 includes a communication unit 202, a browser unit 204, a program storage unit 206, a executing unit 210, an operation accepting unit 212, a display unit 214, a mail transmitting and receiving unit 216, a mail box 218 (shown as "mail BOX" in the figure), an information storage unit 222, a memory access unit 224, a media input and output unit 226, and a control unit 228.

The mobile phone terminal 200 is an ordinary mobile phone having a browser function connectable to the Internet, and has various pieces of information regarding individuals such as address information, mails, and the like. Alternatively, the mobile phone terminal 200 may have an electronic money settlement function or an individual authentication function, and the like. In the following description, the protection of the information in the mobile phone terminal 200 by the present security system includes prevention of access or reference to various private information such as address information or mails, stored in storage units, prevention of the illegal use of an electronic money settlement function and an individual authentication function, and the like. Further, in the present embodiment, though a description is made on the mobile phone terminal 200 as the portable communication terminal which becomes a target of the security system, the embodiment is not limited to this. A portable communication terminal includes, for example, various types of information terminals which are capable of wireless communication and portable such as a mobile phone, PDA, a pager, a note type personal computer, and the like.

The communication unit 202 makes wireless communications with the ASP 100. The browser unit 204 communicates with the ASP 100 through the communication unit 202, and accesses to the Web page provided by the ASP 100. The program storage unit 206 stores application software downloaded from the ASP 100 through the communication unit 202. In the present embodiment, the mobile phone terminal 200 downloads and stores the security program 108 from the ASP 100.

The executing unit 210 executes the program stored in the program storage unit 206. The operation accepting unit 212 accepts the operation of operation keys and the like of the unillustrated mobile phone terminal 200. The display unit 214 is a liquid crystal display panel and the like, and displays character information, images, and moving images. The mail transmitting and receiving unit 216 transmits and receives mails through the communication unit 202. A mail box 218 stores the mails transmitted and received by the mail transmitting and receiving unit 216.

The information storage unit 222 stores various pieces of information including an address book 223. The memory access unit 224 accesses to the mail box 218 and the information storage unit 222, and reads mails and information stored in the mail box 218 and the information storage unit 222, and displays them in the display unit 214 and outputs them to the outside through the media input and output unit 226. The media input and output unit 226 performs the input and output of the data with various media and external storage through various media or external output terminals. For example, the unit 226 outputs the mails and the information stored in the mail box 218 and the information storage unit 222 to media, and inputs data from the media, and stores the data in the information storage unit 222.

Figure 3:
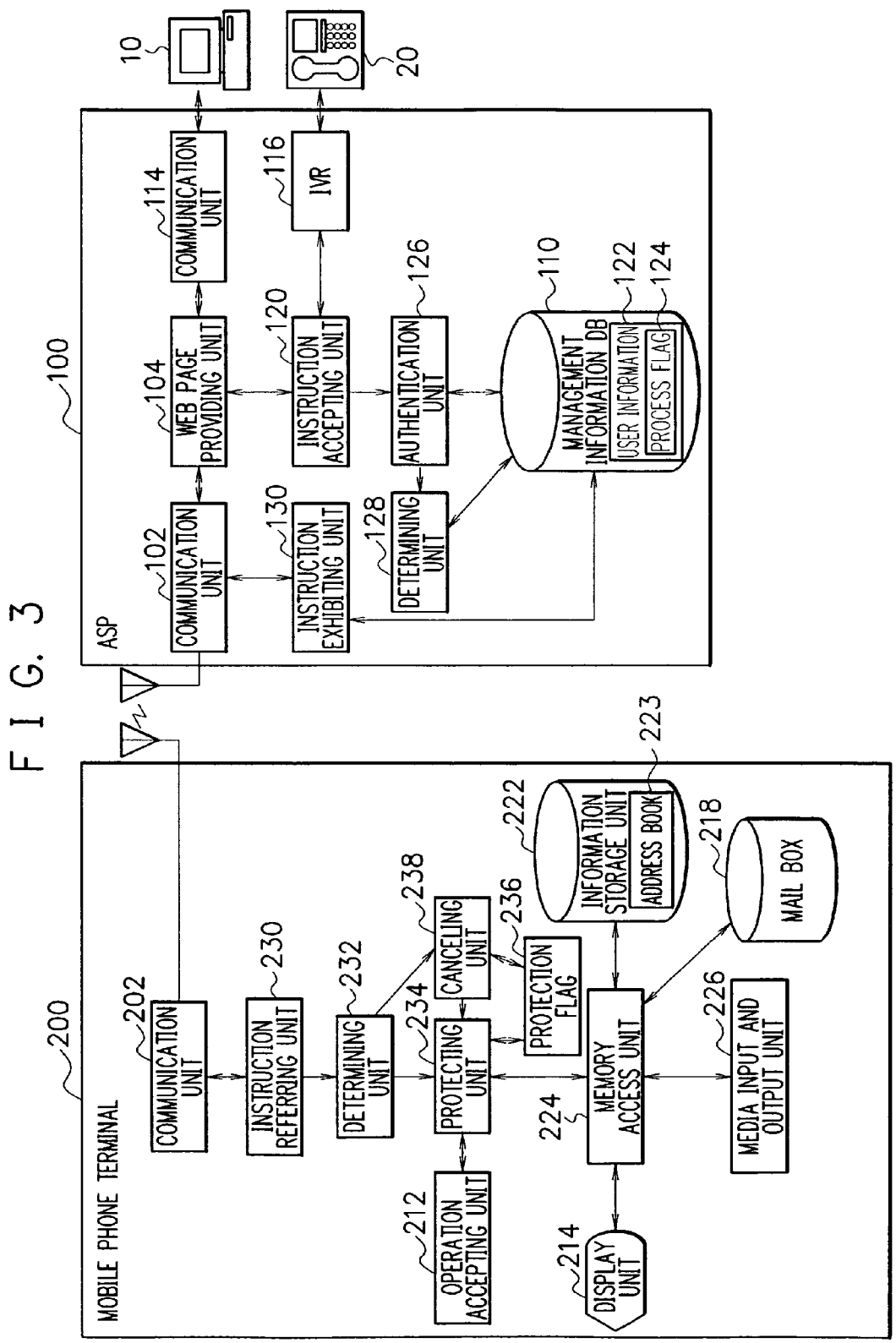
FIG. 3 is a schematic functional block diagram of the security system of FIG. 1.

FIG. 3 is a schematic functional block diagram of the security system constituted as described above.

The ASP 100 of the present embodiment includes an instruction accepting unit 120, an authenticating unit 126, a determining unit 128, and an instruction exhibiting unit 130.

The instruction accepting unit 120 accepts the instruction from the communication terminal device 10 having accessed to the Web page providing unit 104 through the communication unit 114, and at the same time, accepts the instruction from the telephone set 20 through the IVR 116. Alternatively, the instruction accepting unit 120 accepts the instruction from the mobile phone terminal 200 having accessed to Web page providing unit 104 through the communication unit 102.

In the present embodiment, the instruction accepting unit 120 accepts an application for service utilization of the present security system by the user 30 of the mobile phone terminal 200 through the Web page providing unit 104. The Web page proving unit 104 exhibits an application form (not shown) for service utilization, and accepts an application from the user 30. The content of the application includes the phone number of the mobile phone terminal 200 and the password as a user ID. In the present embodiment, though the phone number of the mobile phone terminal 200 has been used as the user ID, the ID is not limited to this. It may be a unique management ID given by the ASP 100. Further, the instruction accepting unit 120 accepts a lost article report of robbery or loss from the user 30 and a cancellation report to cancel the lost article report from the communication terminal device 10 or the telephone set 20. The lost article report and the cancellation report include the user ID of the user 30, for example, the phone number and the password of the mobile phone terminal 200.

In the present embodiment, the management information database 110 has a user information table (shown as "user information" in the figure) 122. The user information table 122, as shown in FIG. 4, is stored, associated with a user ID, a password, and a process flag 124. The process flag 124 shows whether or not the mobile phone terminal 200 of the relevant user ID is currently in the midst of the information protection process. In the case of "1", the process flag 124 is in the midst of the information protection process, while in the case of "0", the process flag 124 is in the midst of the information protection cancellation.

Referring back to FIG. 3, the authenticating unit 126 accesses to the management information database 110, and refers to the user information table 122, and based on the user ID and the password included in the lost article report or the cancellation report, performs the authentication of the user 30. That is, in case the user ID and the password included in the lost article report or the cancellation report coincide with the user ID and the password of the user information table 122, the authentication unit 126 authenticates the user 30.

The determining unit 128, when the authentication unit 126 authenticates the user 30, refers to the user information table 122, and sets "1" to the process flag 124 of the user 30 in case the instruction accepting unit 120 accepts the lost article report, and resets the process flag 124 of the user 30 to "0" in case the instruction accepting unit 120 accepts the cancellation report. Further, the authentication unit 126 registers user IDs and passwords, which are accepted by the instruction accepting unit 120 at the application for the service utilization from the mobile phone terminal 200, in the user information table 122.

The instruction exhibiting unit 130 accesses to the management information database 110, and refers to the user information table 122, and exhibits a status of the process flag 124 to the mobile phone terminal 200 through the communication unit 102.

Further, the mobile phone terminal 200 includes an instruction referring unit 230, a determining unit 232, a protecting unit 234, a protection flag 236, and a canceling unit 238.

The instruction referring unit 230 accesses to the ASP 100 through the communication unit 202, and requests for the exhibition of the process flag 124 owned by the ASP 100, and refers to the process flag 124. The determining unit 232, based on the process flag 124 acquired by the instruction referring unit 230, determines whether the process flag 124 is turned on ("1" in the present embodiment) or turned off ("0" in the present embodiment). In case the process flag 124 is turned on, the determining unit 232 instructs the protecting unit 234 to perform the process of protecting the information. In case the process flag 124 is turned off, the determining unit 232 instructs the canceling unit 238 to cancel the information protection process.

The protecting unit 234, according to the instruction from the determining unit 232, performs the process of protecting various pieces of information in the mobile phone terminal 200. The information to be protected is, for example, mails in the mail box 218, the address book 223 in the information storage unit 222, and the like. Further, in the case of the mobile phone terminal 200 having an electronic settlement function and an individual authentication function, the protecting unit 234 protects the information regarding the electronic settlement function and the individual authentication function. Further, the protecting unit 234, in case of having performed the information protection process, sets the protection flag 236 to "1".

As examples of the information protection process, the followings are conceivable.

(1) The operation keys of the mobile phone terminal 200 are locked so as not to be operable. For example, the mobile phone terminal 200 is constituted such that the depressing of the operation keys is all ignored. However, in case a incoming call arrives at the mobile phone terminal 200, speaking keys may exceptionally function.

(2) The power supply of the mobile phone terminal 200 is automatically shut off.

These processes may be set in advance for each user 30 at the contract of utilization of the present security system or the security program to perform the relevant processes may be provided or the process to be utilized may be selected at the issue of the lost article report.

An example of selecting the process to be utilized at the issue of the lost article report will be described below. The management information database 110 of the ASP 100 has a user information table 132 as shown in FIG. 5, and the user information table 132 is stored, associated with a user ID, a password, a level 1 process flag 134, and a level 2 process flag 135. The instruction accepting unit 120, in addition to the user ID and the password of the user 30, accepts the lost article report including the level of the process desired to be utilized. The authentication unit 126, after authenticating the user 30, sets "1" to the level 1 process flag 134 or the level 2 process flag 135 corresponding to the accepted process level.

In the mobile phone terminal 200, the instruction referring unit 230 requests the ASP 100 to exhibit the level 1 process flag 134 and the level 2 process flag 135 and refers to these flags. The determining unit 232, based on the process flag acquired by the instruction referring unit 230, and depending on which flag is turned on or turned off, determines whether the information in the terminal 200 is protected or the protection process is cancelled, and which of the level 1 process or the level 2 process is performed when the information is protected. The determining unit 232 instructs the protecting unit 234 to perform either from the level 1 process or the level 2 process.

In this manner, the level of the protection process for the mobile phone terminal 200 can be selected, and therefore, an appropriate process can be performed according to the situation, thereby increasing the convenience. For example, if the level is such that "an user has forgotten his/her mobile phone terminal at his/her friend's, the process of "locking the key" is performed, and then, the mobile phone terminal 200 is returned to the user later while his/her friend cannot see the data. Further, if "a company's mobile phone terminal storing important customer information has been robbed", a process of "immediately turning off power so that the terminal cannot be booted" is performed, and the data can be protected.

Referring back to FIG. 3, in case the determining unit 232 determines that the process flag 124 is turned off, the canceling unit 238 allows the protecting unit 234 to cancel the information protection process, and reset the protection flag 236 to OFF ("0" in the present embodiment).

Further as shown in FIG. 6, the mobile phone terminal 200 includes an automatic activating unit 239. The automatic activating unit 239, when the mobile phone terminal 200 is turned on, automatically activates the security program 108. In this manner, the mobile phone terminal 200 of the user 30 using the present security system can be put into a state in which the security program 108 is always active while the power supply stays "ON".

Figure 7:
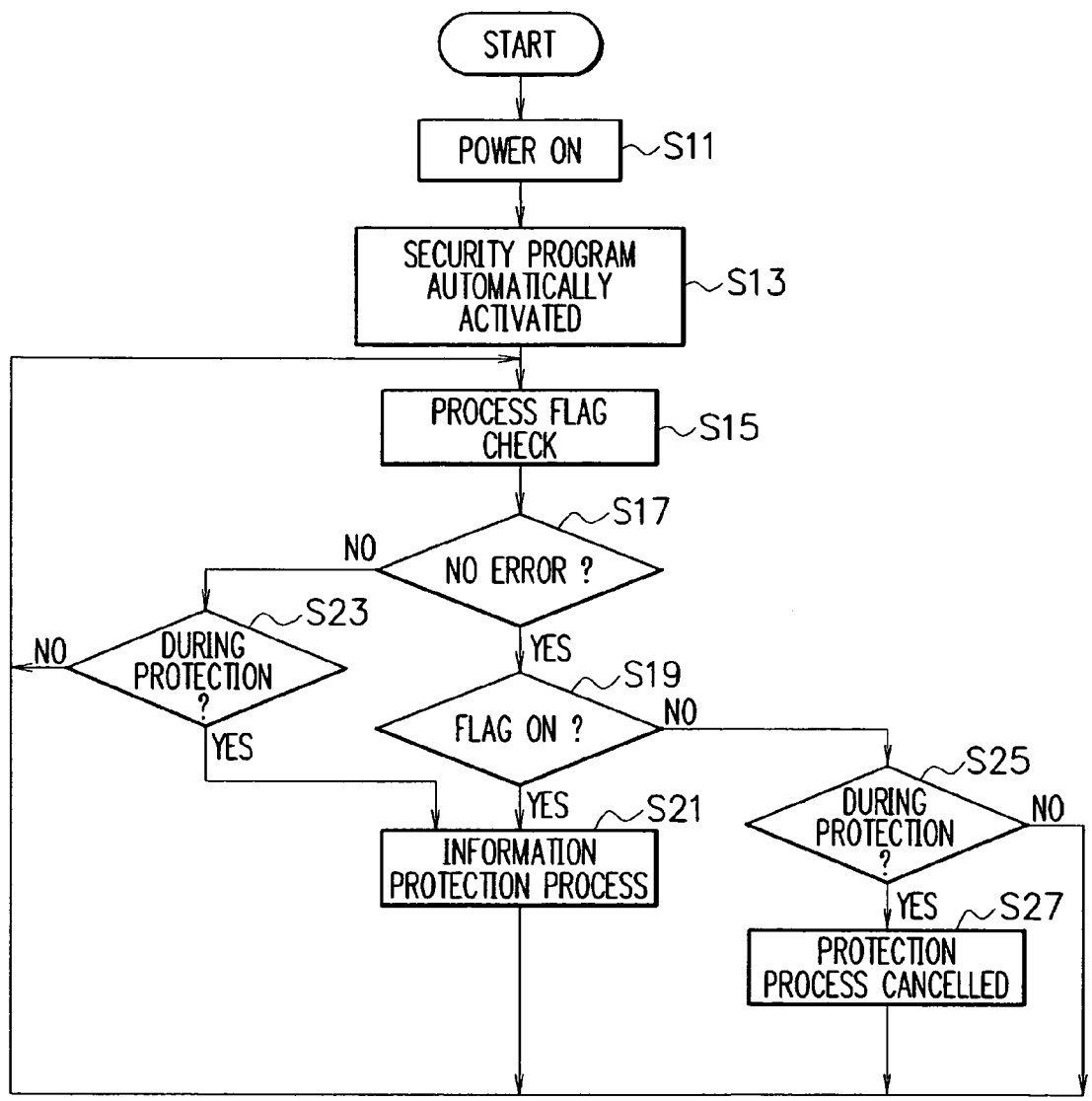
FIG. 7 is a flowchart showing an example of the operation of the mobile phone terminal of the security system of FIG. 3.

FIG. 7 is a flowchart showing an example of the operation of the mobile phone terminal 200 of the present embodiment.

First, when the power supply of the mobile phone terminal 200 is switched on (step S11), the executing unit 210 automatically activates and executes the security programs 108 (step S13). Subsequently, the instruction referring unit 230 accesses to the ASP 100 through the communication unit 202, and requests the ASP 100 to exhibit the process flag 124, and refers to the process flag 124 (step S15). At this time, in the ASP 100, the instruction exhibiting unit 130 accepts the request for the exhibition of the process flag 124 from the mobile phone terminal 200 through the communication unit 102, and accesses to the management information database 110, and refers to the user information table 122, and exhibits the process flag 124 corresponding to the user ID of the mobile phone terminal 200 to the mobile phone terminal 200. The check of the process flag 124 of step S15 is always or periodically executed.

Subsequently, the instruction referring unit 230, when referring to the process flag 124, determines whether or not errors such as communication errors have occurred (step S17). In case no errors have occurred (YES in step S17), the determining unit 232 determines whether or not the process flag 124 is on (step S19). In case the process flag 124 is on (YES in step S19), the protecting unit 234 performs the information protection process, and sets "1" to the protection flag 236 (step S21). Here, for example, the power supply of the mobile phone terminal 200 is automatically shut off.

On the other hand, in case the process flag 124 is off (NO in step S19), the canceling unit 238 determines whether or not the protection flag 236 is on, that is, whether or not the protection flag 236 is in the midst of the information protection process (step S25). In case the information protection process is under way (YES in step S25), the canceling unit 238 cancels the protection process, and resets the protection flag 236 to "0" (step S27). Further, the information protection process is off (NO in step S25), the procedure returns to step S15, and performs the check of the process flag 124.

Further, in case communication errors and the like occur at referring to the process flag 124 in step S15 and the process flag 124 is not acquired (NO in step 17), the protecting unit 234 determines whether or not the protection flag 236 is on, that is, whether or not the protection flag 234 is in the midst of the information protection process (step S23). the information protection process is under way (YES in step S23), the procedure advances to step S21, and the protecting unit 234 performs the information protection process, and sets "1" to the protection flag 236. In case the information protection process is off (NO in step S23), the procedure returns to step S15.

With the process at step S17, in case the power supply of the mobile phone terminal 200 subjected to the information protection process, is turned off once by the security program 108, and then is booted again, even when the communication with the ASP 100 cannot be established outside a service range or the like, the information protection process can be automatically performed by referring to the protection flag 236.

Figure 8:
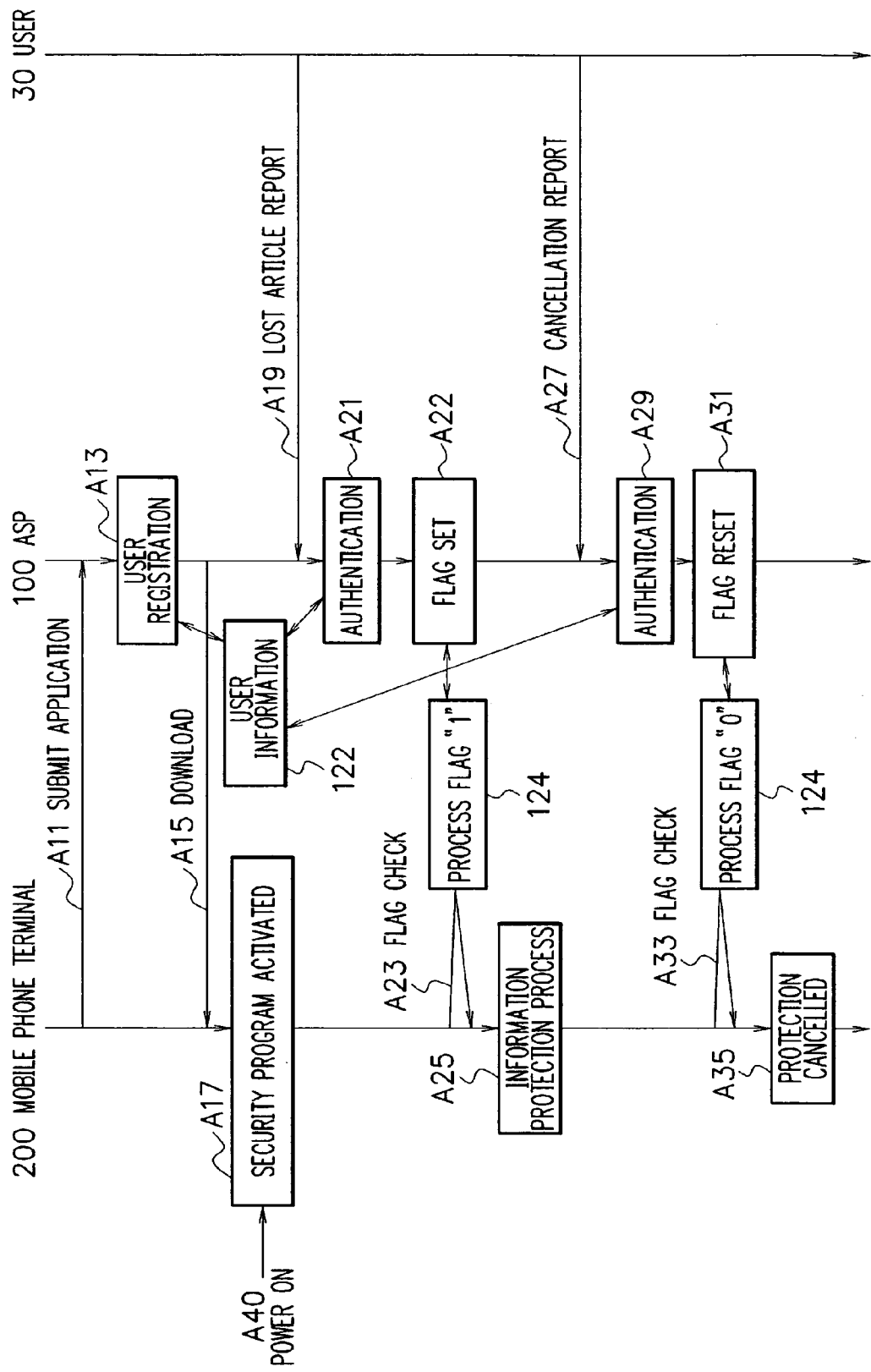
FIG. 8 is a flowchart showing an example of the operation of the security system of FIG. 3.

The operation of the entire system of the security system of the present embodiment constituted as above will be described by using the drawings. FIG. 8 is a flowchart showing an example of the operation of the security system of the present embodiment.

First, the user 30 of the mobile phone terminal 200 submits an application for the present security system (step A11). The user 30 operates the mobile phone terminal 200, accesses to the ASP 100 through the browser unit 204, and refers to the application page of the security system, and thereby submits the application by an application form (not shown). Alternatively, the user 30 accesses to ASP 100 through the communication terminal device 10, and refers to the application page of the security system, and then, may submit the application by the application form. Alternatively, the user makes a phone call to the ASP 100 through the telephone set 20, and then, an input may be made according to the voice guidance of the IVR 116, thereby submitting the application. In the present embodiment, in the application form, the phone number of the mobile phone terminal 200 is taken as the user ID, and the user ID and the password are registered.

The instruction accepting unit 120 of the ASP 100 accepts the application for the service utilization from the mobile phone terminal 200, and the user information table 122 of the management information database 110 is registered with the user ID and the password by the authentication unit 126 (step A13).

Subsequently, security program 108 is downloaded to the mobile phone terminal 200 from the ASP 100 (step A15). To be specific, the mobile phone terminal 200 after the user registration or the user authentication accesses to the download page (not shown) of the security program 108 through the browser unit 204, and downloads the security program 108 through the communication unit 202, and stores the program in the program storage unit 206. Then, the executing unit 210 executes the security program 108 (step A17).

After that, presume that the user 30 has lost the mobile phone terminal 200. The user 30 submits a lost article report to the ASP 100 through the communication terminal device 10 or the telephone set 20 (step A19). Here, a description will be made on the case where a lost article report is submitted through the communication terminal device 10. The communication terminal device 10 accesses to a lost article report page (not shown) provided by the Web page providing unit 104 of the ASP 100, and inputs the user ID and the password necessary for the lost article report.

In the ASP 100, the instruction accepting unit 120 accepts the user ID and the password inputted through the Web page providing unit 104. The authentication unit 126 accesses to the management information database 110, and refers to the user information table 122, and based on the accepted user ID and password, performs the authentication of the user (step A21). In case the user is authenticated, the determining unit 128 accesses to the management information database 110, and sets the process flag 124 of the user information database 122 to "1" (step A22).

On the other hand, in the mobile phone terminal 200, by activating the security program 108, the instruction referring unit 230 accesses to the ASP 100 through the communication unit 202, and requests the ASP 100 to exhibits the process flag 124, and refers to the process flag 124 (step A23). In the ASP 100, the instruction exhibiting unit 130 accepts a request for the exhibition of the process flag 124 from the mobile phone terminal 200 through the communication unit 102, and accesses to the management information database 110, and refers to the user information table 122, and exhibits the process flag 124 corresponding to the user ID of the mobile phone terminal 200 to the mobile phone terminal 200.

In the mobile phone terminal 200, the determining unit 232 determines whether or not the process flag 124 received from the ASP 100 is on. In case the determining unit 232 determines that the process flag 124 is on, the protecting unit 234 performs the information protection process (step A25). The information protection process, as described above, for example, automatically shuts off the power supply of the mobile phone terminal 200.

In this state, when the power supply of the mobile phone terminal 200 is switched on (step A40), the security programs 108 is activated again (step A17). The instruction referring unit 230 accesses to the ASP 100 through the communication unit 202, and requests the ASP 100 to exhibit the process flag 124, and refers to the process flag 124 (step A23). Since the process flag 124 is "1", the determining unit 232 determines that the process flag 124 is on, and the protecting unit 234 performs the information protection process, and, for example, automatically shuts off the power supply of the mobile phone terminal 200 (step A25).

In this manner, for the lost mobile phone terminal 200, the information protection process of the mobile phone terminal 200 can be remotely performed through the ASP 100.

After that, when the mobile phone terminal 200 is returned to the user 30, the user 30 submits the cancellation report to the ASP 100 through the communication terminal device 10 or the telephone set 20 (step A27). Here a description will be made on the case where the cancellation report is submitted through the telephone set 20. The user 30 makes a phone call to the ASP 100 by using the telephone set 20, and according to the voice guidance from the IVR 116 of the ASP 100, inputs the user ID and the password necessary for the cancellation report.

In the ASP 100, the instruction accepting unit 120 accepts the user ID and the password inputted from the telephone set 20 through the IVR 116. The authentication unit 126 accesses to the management information database 110, and refers to the user information table 122, and based on the user ID and the password accepted, performs the authentication of the user (step A29). In case the user is authenticated, the determining unit 128 accesses to the management information database 110, and resets the process flag 124 of the user information table 122 to "0" (step A31).

In this state, when the power supply of the mobile phone terminal 200 is switched on again, the security programs 108 is activated, and the instruction referring unit 230 accesses to the ASP 100 through the communication unit 202, and requests the ASP 100 to exhibit the process flag 124, and refers to the process flag 124 (step A33). In the mobile phone terminal 200, the determining unit 232 determines whether or not the process flag 124 received from ASP 100 is on. In case the determining unit 232 determines that the process flag 124 is off, the canceling unit 238 cancels the information protection process (step A35).

In this manner, when the mobile phone terminal 200 is returned to the user 30, the information protection process can be cancelled.

As described above, according to the security system of the present embodiment, since an access can be periodically made from the mobile phone terminal 200 to the ASP 100 to determine whether or not the information protection process should be performed, it is possible to remotely protect the information in the mobile phone terminal 200 when the terminal is lost or stolen.

Further, through the execution of the user certification, the illegal information protection process and cancellation of the protection process of the mobile phone terminal can be prevented so that the security of the present system is enhanced.

Second Embodiment

FIG. 9 is a block diagram showing the constitution of a security system according to the embodiment of the present invention. The security system of the present embodiment is different from the embodiment shown in FIG. 3 in that information protection is notified to a mobile phone terminal 200 by a mail transmission from an ASP 100, and the mobile phone terminal 200 starts a process of the information protection.

The ASP 100 includes, in addition to the components of the ASP 100 of the above described embodiment, a notifying unit 140 and a mail transmitting and receiving unit 142.

Here, a determining unit 128, when an instruction accepting unit 120 accepts a lost article report, accesses to a management information database 110, and refers to an user information table 122, and sets a process flag 124 of a user 30 authenticated by an authentication unit 126 to "1", and at the same time, instructs the notifying unit 140 to notify the terminal 200 of an information protection instruction.

The notifying unit 140, according to this instruction, instructs the mail transmitting and receiving unit 142 to transmits an information protection instruction mail to the mobile phone terminal 200. The mail transmitting and receiving unit 142, according to this instruction, prepares an information protection instruction mail, and transmits this mail to the mobile phone terminal 200 through a communication unit 102. Here, the information protection instruction mail has, for example, a few words showing the information protection instruction in a title or text. Alternatively, the mail is transmitted from a predetermined mail address.

The mobile phone terminal 200, in addition to the components of the above described embodiment, includes a analyzing unit 240 and a determining unit 242.

Here, the mail transmitting and receiving unit 216 receives the information protection instruction mail from the ASP 100 through a communication unit 202, and delivers it to the analyzing unit 240. The analyzing unit 240 analyzes the mails received from the mail transmitting and receiving unit 216, and determines whether or not it is the information protection instruction mail. For example, the analyzing unit 240 checks whether or not the title or the text of the received mail includes the information protection instruction. Alternatively, it checks whether or not the mail address of the transmitting end is a predetermined address. When the analyzing unit 240 determines that it is the information protection instruction mail, it notifies the determining unit 242 that the information protection instruction mail has been received.

When the determining unit 242 is notified by the analyzing unit 240 that the information protection instruction mail has been received, the determining unit 242 instructs the protecting unit 234 to perform the process of protecting the information. After having received the information protection instruction mail and performed the process of protecting the information, the determining unit 242, based on a process flag 124 acquired by the instruction referring unit 230, determines whether the process flag 124 is on ("1" in the present embodiment) or off ("0" in the present embodiment). What is different from the above described embodiment is that the referring to the process flag 124 by the instruction referring unit 230 is started after the information protection instruction mail is received. By means of this constitution, since the process flag 124 is periodically checked when the terminal is normally used so that the ASP need not be accessed, the number of communications with the ASP 100 can be sharply reduced. Further, the portable communication terminal 200 receives the protection instruction mail, so that the process of protecting the information can be quickly started, thereby increasing the reliability of the system.

The operation of the entire system of the security system of the present embodiment constituted as described above will be described in reference to the drawings. FIG. 10 is a flowchart showing an example of the operation of the security system of the present embodiment. Since this flowchart is the same as the flowchart of the security system of the embodiment of FIG. 8 in step A11 to step A22 and step A25 to step A35, the same reference numerals are attached, and the description thereof will be omitted.

In the mobile phone terminal 200, after the security program 108 is activated (step A17), in the ASP 100, when the lost article report is submitted by the user 30 (step A19) and the user 30 is authenticated (step A21), the determining unit 128 accesses to the management information database 110, and sets the process flag 124 of the user information table 122 to "1" (step A22). At the same time, the determining unit 128 instructs the notifying unit 140 to notify the terminal 200 of the information protection instruction. According to this instruction, the notifying unit 140 instructs the mail transmitting and receiving unit 142 to transmit the information protection instruction mail to the mobile phone terminal 200 of the user 30. According to this instruction, the mail transmitting and receiving unit 142 prepares the information protection instruction mail, and transmits it to the mobile phone terminal 200 through the communication unit 102 (step B11).

In the mobile phone terminal 200, when the power supply of the mobile phone terminal 200 is turned on, and the mobile phone terminal 200 is within a service range, the mail transmitting and receiving unit 216 receives the information protection instruction mail from the ASP 100 through the communication unit 202. The mail transmitting and receiving unit 216 delivers the mail to the analyzing unit 240, and the analyzing unit 240 analyzes the mail, and determines whether or not it is the information protection instruction mail (step B13). The analyzing unit 240 determines that it is the information protection instruction mail, and notifies the determining unit 242 accordingly. An instruction is issued from the determining unit 242 to the protecting unit 234 so that the process of protecting the information is performed, and according to the instruction, the protecting unit 234 performs the process of protecting the information (step A25). Further, the protecting unit 234 sets the protection flag 236 to "1". By the information protection process as described above, for example, the power supply of the mobile phone terminal 200 is automatically shut off.

Hereinafter, in case the power supply of the mobile phone terminal 200 is switched on again, the security program 108 is automatically activated, and based on the process flag 124 acquired by the instruction referring unit 230 by periodically accessing to the ASP 100, the determining unit 242 determines whether the process flag 124 is on ("1" in the present embodiment) or off ("0" in the present embodiment) (step B15). Until the cancellation report is submitted from the user 30, the process flag 124 is on, and therefore, the information protection process by the protecting unit 234 is continued (step B17).

In this manner, for the lost mobile phone terminal 200, the information protection process of the mobile phone terminal 200 can remotely be performed through the ASP 100.

After that, when the mobile phone terminal 200 is returned to the user 30, and the cancellation report is submitted by the user 30 (step A27) to the ASP 100, and the user 30 is authenticated (step A29), the determining unit 128 accesses to the management database 110, and resets the process flag 124 of the user information table 122 to "0" (step A31).

In this state, when the power supply of the mobile phone terminal 200 is switched on again, the security programs 108 is activated, and the instruction referring unit 230 refers to the process flag 124 (step A33). The determining unit 242 determines that the process flag 124 is off, and the canceling unit 238 cancels the information protection process (step A35).

In this manner, when the mobile phone terminal 200 is returned to the user 30, the information protection process is cancelled.

As described above, according to the security system of the present embodiment, it is possible to protect the information in the mobile phone terminal when the terminal is lost or stolen.

Third Embodiment

FIG. 11 is a block diagram showing the constitution of a security system according to the embodiment of the present invention. The security system of the present embodiment is different from the embodiment of FIG. 9 in that not only an information protection report is transmitted to a mobile phone terminal 200 by mail from an ASP 100, but also a protection cancellation report is also transmitted to the mobile phone terminal 200 by mail from the ASP 100, and thereby an information protection process and an protection cancellation process is performed.

The ASP 100 includes a notifying unit 144 instead of the instruction exhibiting unit 130 in FIG. 3. Further, the process flag 124 of the user information table 122 of a management information database 110 in FIG. 3 is not needed. However, for the management purpose of the ASP 100, a protection process situation of each mobile phone terminal 200 may be stored.

The notifying unit 144, according to the instruction from a determining unit 128, instructs a mail transmitting and receiving unit 112 to transmit an information protection instruction mail to the mobile phone terminal 200. Further, the determining unit 128, when the instruction accepting unit 120 accepts a cancellation report, accesses to the management information database 110, and refers to the mail transmitting and receiving unit 112, and instructs the notifying unit 144 to notify the terminal 200 of the protection cancellation instruction. The notifying unit 144, according to this instruction, instructs the mail transmitting and receiving unit 112 to transmit a protection cancellation mail to the mobile phone terminal 200.

The mail transmitting and receiving unit 112, according to the instruction from the notifying unit 144, prepares an information protection instruction mail or a protection cancellation instruction mail, and transmits the mail to the mobile phone terminal 200 through a communication unit 102. Here, the information protection instruction mail or the protection cancellation instruction mail is transmitted, for example, mentioning a few words indicating the information protection instruction or the protection cancellation instruction in the title or the text. Alternatively, the mail is transmitted from different mail addresses predetermined for each instruction. The mobile phone terminal 200 includes an analyzing unit 244 and a determining unit 246 in place of the instruction referring unit 230 and the determining unit 232 in FIG. 3.

Here, the mail transmitting and receiving unit 216 receives mails through a communication unit 202, and delivers it to the analyzing unit 244. The analyzing unit 244 analyzes the mail received from the mail transmitting and receiving unit 216, and determines whether or not it is the information protection instruction mail or the protection cancellation instruction mail. For example, the analyzing unit 244 checks whether or not the tile or the text of the received mail contains the information protection instruction or the protection cancellation instruction. Alternatively, the analyzing unit 244 checks whether or not the mail address of the transmitting end is the predetermined address corresponding to each instruction. The analyzing unit 244 notifies the determined result to the determining unit 246. Further, in case it is determined that the transmitted mail is neither the information protection instruction mail nor the protection cancellation mail, the analyzing unit 244 stores the mail in a mail box 218, and instructs the mail transmitting and receiving unit 216 to check mails again.

When notified that the information protection instruction mail is received from the analyzing unit 244, the determining unit 246 instructs the protecting unit 234 to perform the process of protecting the information. Further, when notified that the protection cancellation instruction mail is received from the analyzing unit 244, the determining unit 246 instructs the canceling unit 238 to cancel the protection.

FIG. 12 is a flowchart showing an example of the operation of the mobile phone terminal 200 of the present embodiment. This flowchart is different from the flowchart of the operation of the mobile phone terminal 200 of the embodiment of FIG. 7 in that step S31 for the mail check instead of step S15 for the flag check, step S33 for the presence or absence of a mail and a communication error determination instead of step S17 of the communication error determination, and step S35 for the mail determination instead of step S19 for the flag determination are provided.

First, when the power supply of the mobile phone terminal 200 is switched on (step S11), the security program 108 is automatically activated and executed by the executing unit 210 (step S13). Subsequently, the mail transmitting and receiving unit 216 accesses to a mail server (not shown) through the communication unit 202, and performs a mail check (step S31). Subsequently, the analyzing unit 244, at the mail checking time, determines whether or not the received mail is found, and further, determines whether or not an error such as a communication error is found (step S33).

In case the received mail is found, but no communication error is found (YES in step S33), the analyzing unit 244 analyzes the mail received from the mail transmitting and receiving unit 216, and determines whether or not it is the information protection instruction mail or the protection cancellation instruction mail (step S35). In case the analyzing unit 244 determines that it is the information protection instruction mail (protection of step S35), the analyzing unit 244 notifies the determination result to the determining unit 246, and the determining unit 246 instructs the protecting unit 234 to perform the process of protecting the information. The protecting unit 234 performs the information protection process, and sets "1" to the protection flag 236 (step S21). Here, for example, the power supply of the mobile phone terminal 200 is automatically shut off.

On the other hand, in case it is determined that the received mail is the protection cancellation instruction mail (cancellation of step S35), the analyzing unit 244 notifies the determining unit 246 of the determination result, and the determining unit 246 instructs the canceling unit 238 to perform the process of canceling the protection. The canceling unit 238 cancels the protection process, and resets the protection flag 236 to "0" (step S27). Further, in case it is determined that the received mail does not fall within the previous two kinds of mail (others of step S35), the analyzing unit 244 stores the mail in the mail box 218, and the procedure returns to step S31. The mail check of step S31 may be performed at a predetermined time or periodically. Alternatively, the mail check may be not performed, and the mail from the mail server may be simply received, but in order to acquire the report and perform a quick process, it is preferable that the mail is periodically checked.

Figure 13:
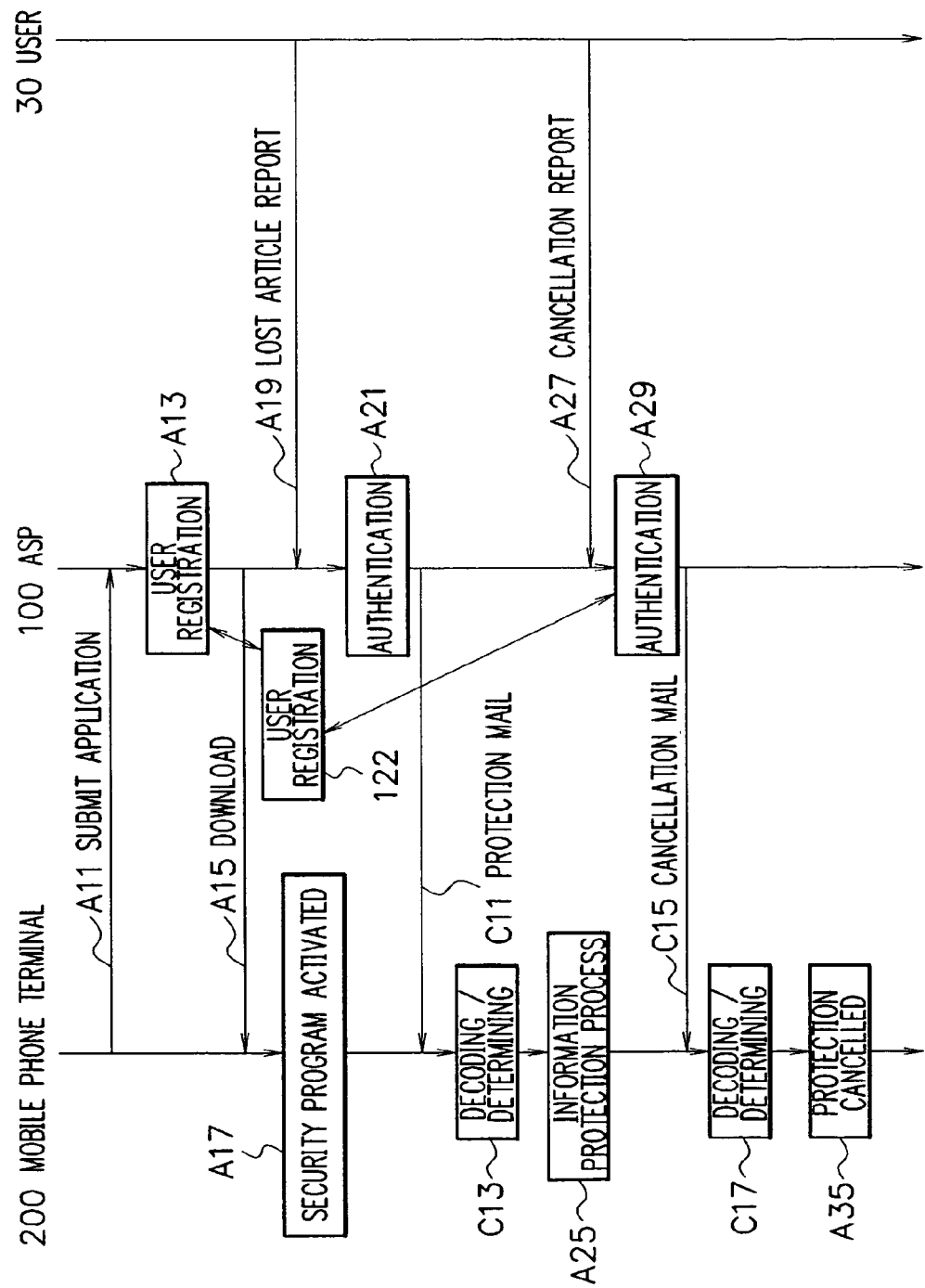
FIG. 13 is a flowchart showing an example of the operation of the security system of FIG. 11.

The operation of the entire system of the security system of the present embodiment constituted as described above will be described with reference to the drawings. FIG. 13 is a flowchart showing an example of the operation of the security system of the present embodiment. Since this flowchart is the same as the flowchart of the security system of the embodiment of FIG. 10 in step A11 to step A21, step A25 to step A29, and step A35, the same reference numerals are attached and the description thereof will be omitted.

In the mobile phone terminal 200, after the security program 108 is activated (step A17), when a lost article report is submitted by the user 30 to the ASP 100 (step A19) and the user 30 is authenticated (step A21), the determining unit 128 instructs the notifying unit 144 to notify the terminal 200 of the information protection instruction. According to this instruction, the notifying unit 144 instructs the mail transmitting and receiving unit 112 to transmit the information protection instruction mail to the mobile phone terminal 200 of the user 30 authenticated by the authentication unit 126. According to this instruction, the mail transmitting and receiving unit 112 prepares the information protection instruction mail, and transmits it to the mobile phone terminal 200 through the communication unit 102 (step C11).

In the mobile phone terminal 200, the mail transmitting and receiving unit 216 receives the information protection instruction mail from the ASP 100 through the communication unit 202, and delivers the mail to the analyzing unit 244, and the analyzing unit 244 analyzes the mail, and determines whether or not it is the information protection instruction mail or the information protection cancellation instruction mail (step C13). The analyzing unit 244 determines that it is the information protection instruction mail, and notifies the determining unit 246 accordingly. An instruction is issued from the determining unit 246 to the protecting unit 234 to the effect that the process of protecting the information be performed, and according to the instruction, the protecting unit 234 performs the process of protecting the information (step A25). Further, the protecting unit 234 sets the protection flag 236 to "1". By the information protection process as described above, for example, the power supply of the mobile phone terminal 200 is automatically shut off.

In this manner, for the lost mobile phone terminal 200, the information protection process of the mobile phone terminal 200 can remotely be performed through the ASP 100.

After that, when the cancellation report is submitted by the user 30 to the ASP 100 (step A27) and the user 30 is authenticated (step A29), the determining unit 128 instructs the notifying unit 144 to notify the protection cancellation instruction to the mobile phone terminal 200 of the user 30. According to this instruction, the notifying unit 144 instructs the mail transmitting and receiving unit 112 to transmit the protection cancellation instruction mail to the mobile phone terminal 200 of the user 30 authenticated by the authentication unit 126. According to this instruction, the mail transmitting and receiving unit 112 prepares the protection cancellation instruction mail, and transmits it to the mobile phone terminal 200 through the communication unit 102 (step C15).

In this state, in the mobile phone terminal 200, when the power supply is switched on, the mail transmitting and receiving unit 216 accesses to the mail server (not shown) through the communication unit 202, and receives the mail. The mail transmitting and receiving unit 216 receives the protection cancellation instruction mail from the ASP 100 through the communication unit 202, and delivers it to the analyzing unit 244, and the analyzing unit 244 analyzes the mail, and determines whether the mail is the information protection instruction mail or the protection cancellation instruction mail (step C17). In case the mail is not received and the mail is not the protection cancellation instruction mail, the information protection process continues. That is, the power supply is shut off (not shown).

The analyzing unit 244 determines that the mail is the protection cancellation instruction mail, and notifies the determining unit 246 accordingly. The determining unit 246 directs the canceling unit 238 to cancel the protection process, and according to the instruction, the canceling unit 238 cancels the protection process (step A35).

In this manner, when the mobile phone terminal 200 is returned to the user 30, the information protection process can be cancelled.

As described above, according to the security system of the present embodiment, it is possible to protect the information in the mobile phone terminal when the terminal is lost or stolen. Further, after the protection process is performed, the process flag 124 is periodically checked, and therefore, there is no need to access to the ASP 100, and the number of communications with the ASP 100 can be remarkably reduced.

Fourth Embodiment

FIG. 14 is a block diagram showing the constitution of a security system according to the embodiment of the present invention. The security system of the present embodiment is different from the embodiment of FIG. 3 in that information protection reports and the protection cancellation report transmitted through a predetermined phone number from an ASP 100 are received by an mobile phone terminal 200, and the information protection process and the protection process cancellation are performed where the receipt of the reports acts as a trigger.

The ASP 100 includes, in addition to the components of the ASP 100 of the above described embodiment, a notifying unit 150, an originating unit 152, and a number storage unit 154 instead of an instruction exhibiting unit 130. Further, the process flag 124 of the user information table 122 of a management information database 110 in FIG. 3 is not necessary. However, for the management purpose of the ASP 100, protection process situations of each mobile phone terminal 200 may be stored.

Here, a determining unit 128, when an instruction accepting unit 120 accepts a loss report or a cancellation report, accesses to the management information database 110, and refers to the user information table 122, and instructs a notifying unit 150 to notify the terminal 200 of an information protection instruction.

The notifying unit 150, according to this instruction, accesses to the number storage unit 154, and refers to an originating call number table 156 shown in FIG. 15A, and acquires a phone number corresponding to the information protection instruction, and instructs the originating unit 152 to make a phone call to the mobile phone terminal 200 from the acquired phone number. As shown in FIG. 15A, the originating call number table 156 has outgoing phone numbers for information protection report and protection cancellation report, respectively. The originating unit 152, according to the instruction from the notifying unit 150, makes a phone call to the predetermined originating phone number directed to the mobile phone terminal 200 through the communication unit 102.

The mobile phone terminal 200, in addition to the components of the above described embodiment, includes a terminating unit 250, a number storage unit 252, and a determining unit 254 instead of the instruction referring unit 230 and the determining unit 232.

The terminating unit 250 receives a phone call from the ASP 100 through the communication unit 202, and obtains the phone number. The determining unit 254 accesses to the number storage unit 252, and refers to a called number table 256 shown in FIG. 15B, and determines that the called number received by the terminating unit 250 is either of the information protection report or the protection cancellation report. When it is determined that the number is related to the information protection report, the determining unit 254 instructs the protecting unit 234 to perform the process of protecting the information. On the other hand, when it is determined that the number is related to the protection cancellation report, the determining unit 254 instructs the canceling unit 238 to cancel the protection process.

Figure 16:
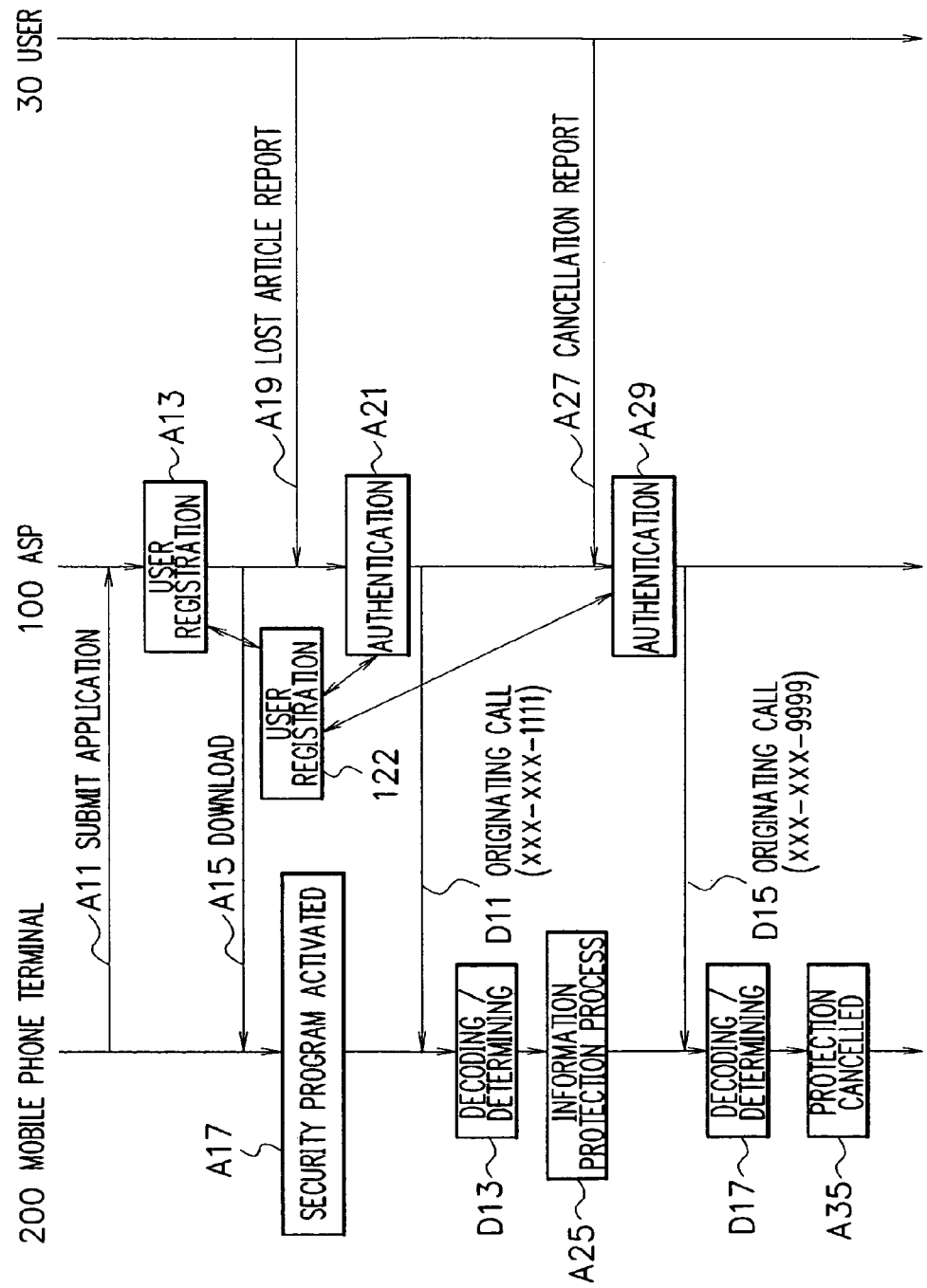
FIG. 16 is a flowchart showing an example of the operation of the security system of FIG. 14.

The operation of the entire system of the security system of the present embodiment constituted as described above will be described with the drawings. FIG. 16 is a flowchart showing an example of operations of the security system of the present embodiment. Since this flowchart is the same as the flowchart of the security system of the embodiment of FIG. 8 in step A11 to step A21, step S25 to step S29, and step S35, the same reference numerals are attached, and the description thereof will be omitted.

After the security program 108 is activated in the mobile phone terminal 200 (step A17), when a lost article report is submitted by the user 30 to the ASP 100 (step A19) and the user 30 is authenticated (step A21), the determining unit 128 instructs the notifying unit 150 to notify the terminal 200 of the information protection instruction.

According to this instruction, the notifying unit 150 accesses to the number storage unit 154, and refers to the originating call number table 156, and acquires an originating phone number (xxx-xxx-1111) for information protection instruction, and instructs the originating unit 152 to make a phone call. According to this instruction, the originating unit 152 makes a phone call to the mobile phone terminal 200 from the originating phone number through the communication unit 102 (step D11).

In the mobile phone terminal 200, the terminating unit 250 receives a call from the ASP 100 through the communication unit 202, and delivers the called number to the determining unit 254 (step D13). Here, the called number is [xxx-xxx-1111]. The determining unit 254 accesses to the number storage unit 252, and refers to the called number table 256, and determines the report corresponding to the called number, and determines that it is the information protection report.

Determining unit 254 instructs the protecting unit 234 to perform the process of protecting the information, and according to the instruction, the protecting unit 234 performs the process of protecting the information (step A25). Further, the protecting unit 234 sets the protection flag 236 to "1". By the information protection process as described above, for example, the power supply of the mobile phone terminal 200 is automatically shut off.

Then, the determining unit 254, in case the power supply of the mobile phone terminal 200 is switched on, refers to the protection flag 236, and determines whether or not the mobile phone terminal 200 is currently in the midst of the information protection process, and in case the mobile phone terminal 200 is in the midst of the information protection process, the power supply of the mobile phone terminal 200 is automatically shut off (not shown).

In this manner, for the lost mobile phone terminal 200, the information protection process of the mobile phone terminal 200 can remotely be performed trough the ASP 100.

After that, in the ASP 100, when the cancellation report is submitted by the user 30 (step A27) and the user 30 is authenticated (step A29), the determining unit 128 instructs the notifying unit 150 to notify the terminal 200 of the protection cancellation instruction.

According to this instruction, the notifying unit 150 accesses to the number storage unit 154, and refers to the originating call number table 156, and acquires an originating call number (xxx-xxx-9999) for protection cancellation instruction, and instructs the originating unit 152 to make a phone call. According to this instruction, the originating unit 152 makes a phone call to the mobile phone terminal 200 from the originating phone number through the communication unit 102 (step D15).

In the mobile phone terminal 200, the terminating unit 250 receives a phone call from the ASP 100 through the communication unit 202, and delivers the called number to the determining unit 254 (step D17). Here, the called number is [xxx-xxx-9999]. The determining unit 254 accesses to the number storage unit 252, and refers to the called number table 256, and determines the report corresponding to the called number, and determines that it is the information protection report.

The determining unit 254 instructs the canceling unit 238 to cancel the protection process, and according to the instruction, the canceling unit 238 cancels the protection process (step A35).

In this manner, when the mobile phone terminal 200 is returned to the user 30, the information protection process can be cancelled.

As described above, according to the security system of the present embodiment, with a call incoming from the predetermined phone number registered in advance acting as a trigger, the information protection process or the cancellation of the protection process of the mobile phone terminal 200 can be performed, and therefore, even in case the mobile phone terminal 200 cannot be connected to the Internet, if a telephone call gets through, it is possible to protect or cancel the information. In this manner, by the security system of the present embodiment, it is possible to protect the information in the mobile phone terminal when the terminal is lost or stolen.

Fifth Embodiment

Figure 17:
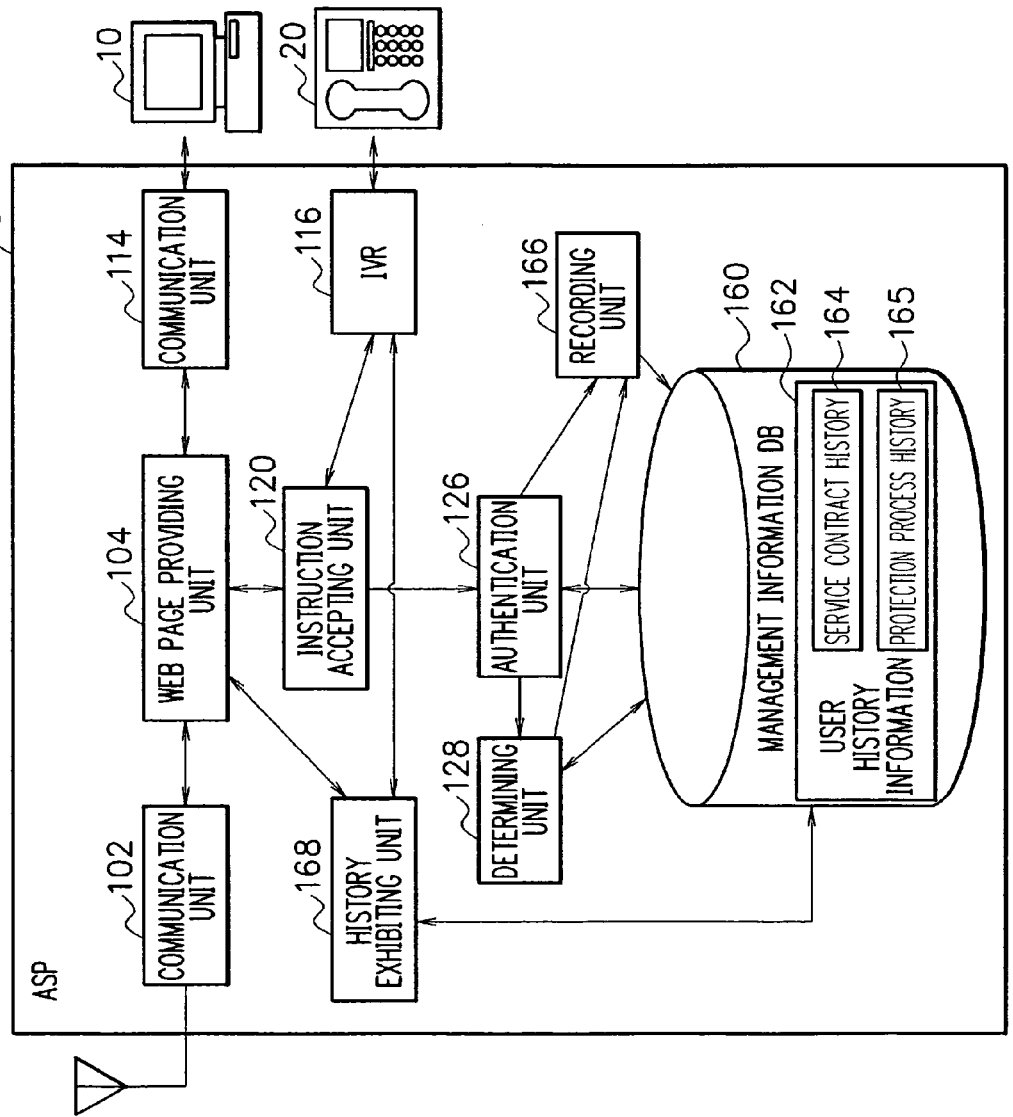
FIG. 17 is a block diagram showing the constitution of the ASP of the securing system according to the embodiment of the present invention.

FIG. 17 is a block diagram showing the constitution of a security system according to the embodiment of the present invention. The security system of the present embodiment is different from the above described embodiment in that an ASP 100 has utilization history information on the present security system, and provides it to the user 30 of a mobile phone terminal 200.

The ASP 100, in addition to the components of the ASP 100 of the above described embodiment, includes a management information database 160, a recording unit 166, and a history exhibiting unit 168 instead of the management information database 110.

The management database 160 includes a user history information storage unit 162 (shown as "user history information" in the figure). A service contract history 164 and a protection process history 165 is recorded to the user history information storage unit 162 by the recording unit 166.

The service contract history 164 is recorded with an application date and time, and the cancellation date and time for utilization of the present security system, or the like. The protection process history 165 is recorded with the date and time of an information protection process and a protection cancellation performed according to lost article reports and cancellation reports from the user 30.

When a user 30 requests for referring to the service contract history 164 or the protection process history 165 through a communication terminal device 10, the history exhibiting unit 168 exhibits each history. To be specific, when the user 30 accesses to the ASP 100 through the communication terminal device 10, the history exhibiting unit 168 exhibits reference pages (not shown) of the service contract history 164 or the protection process history 165 through a Web page providing unit 104. When the Web page providing unit 104 accepts a user ID of the user 30, the history exhibiting unit 168 accesses to the user history information recording unit 162 of the management database 160, and acquires the service contract history 164 or the protection process history 165 corresponding to the accepted user ID.

Alternatively, the history exhibiting unit 168 accepts a referring request for the service contract history 164 or the protection process history 165 from the user 30 through an IVR 116, and transmits the history to the user 30 by voice.

According to the security system of the present embodiment thus constituted, according to the request of the user 30, the protection process history showing that the information in the mobile phone terminal 200 is protected can be exhibited, and therefore, the user 30 who feels uneasy without the terminal is relieved.

Sixth Embodiment

Figure 18:
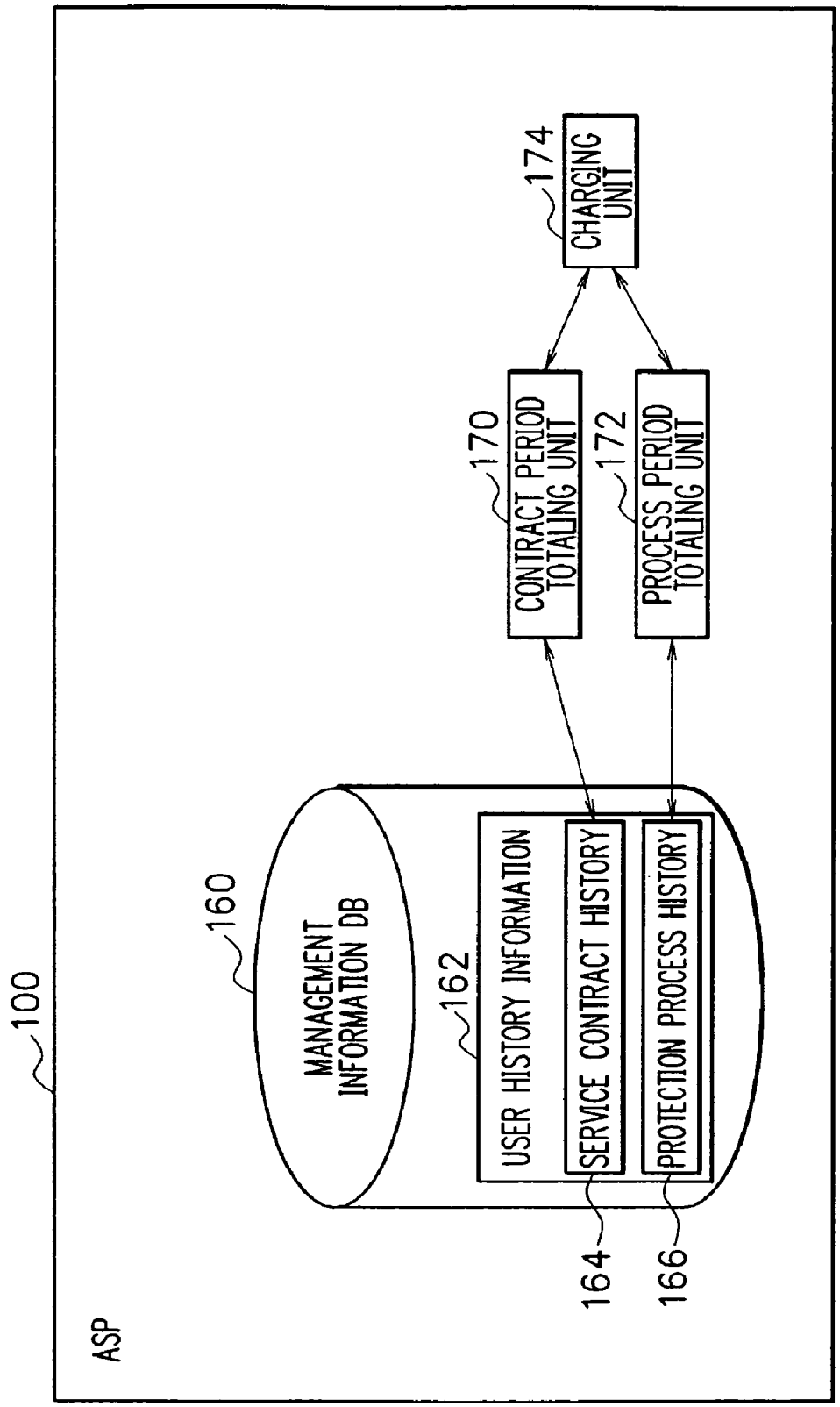
FIG. 18 is a block diagram showing the constitution of the ASP of the securing system according to the embodiment of the present invention.

FIG. 18 is a block diagram showing the constitution of a security system according to the embodiment of the present invention. The security system of the present embodiment is different from the embodiment of FIG. 17 in that an ASP 100 charges a service charge based on the utilization history information on the present security system.

The ASP 100, in addition to the components of the ASP 100 of the embodiment of FIG. 17, includes a contract period totaling unit 170, a process period totaling unit 172, and a charging unit 174.

The contract period totaling unit 170 accesses to the user history information storage unit 162 of a management information database 160, and sums charging periods starting from the application for service of each user 30 to the present point of time with reference to the service contract history 164.

The process period totaling unit 172 accesses to the user history information storage unit 162 of the management information database 160, and sums periods in which the information protection process of each user 30 is performed with reference to a protection process history 165.

The charging unit 174 charges a service utilization charge to each user 30 according to the periods summed by the contract period totaling unit 170 and the process period totaling unit 172.

According to the security system of the present embodiment like above, the service utilization charge can be charged according to the utilization of the protection process service and a contract period.

While the embodiments of the present invention have been described with reference to the drawings, these embodiments are illustrative purposes of the present invention, and it is to be understood that various constitutions other than those described as above may be adopted without departing from the spirit and scope of the invention.

For example, the originating call number table 156 and the called number table 256 shown in FIG. 15 can be, for example, as shown in FIG. 19, turned into an originating call number table 180 and a called number table 260 which are registered with originating phone numbers and called phone numbers corresponding to plural protection processes. In this manner, at the submitting time of a lost article report, the user 30 can instruct the process to be performed for the mobile phone terminal 200 by selecting appropriate one from plural processes.

Further, as the cancellation method of the protection process for the mobile phone terminal 200, in the above described embodiments, while the user 30 has issued the cancellation instruction through the ASP 100, other methods as described below can be considered.

In the ASP 100, the instruction accepting unit 120 accepts the registration of a specific operation key pattern as a lost article report. When the protection process report is transmitted from the ASP 100 to the mobile phone terminal 200, this operation key pattern is transmitted together. In the mobile phone terminal 200, the protection process is performed, and at the same time, this operation key pattern is accepted and stored. When the user 30, getting back the terminal, turns on the mobile phone terminal 200 and keys are depressed along this operation key pattern, the protection process may be allowed to be cancelled.

The mobile phone terminal 200 includes a determining unit that accepts the key operation of this operation key pattern and judges the operation, when the power supply is switched on and the security program 108 is activated. When it is confirmed that the operation of the operation key pattern is accepted by the determining unit, the protection process is cancelled by the canceling unit 238. Further, at this time, a cancellation report mail to notify that the protection process is cancelled is transmitted from the terminal 200 to the ASP 100, and the ASP 100 receives the cancellation report mail, and the process flag 124 of the mobile phone terminal 200 of the user information table 122 becomes off.

According to this constitution, even if the mobile phone terminal 200 returned to the user is not allowed to access to the ASP 100, the mobile phone terminal can be made operable immediately, thereby enhancing usability.

Further, in the above described embodiments, while the method of performing (issuing) the protection instruction and the cancellation instruction to the mobile phone terminal 200 from the ASP 100 have been performed by the process flag 124, the instruction mail, the phone call and the like, respectively, these means can be combined, and can be selectively used according to the situation.

What is claimed is:

1. A security system comprising a control device to protect said information in a portable communication terminal having an information storage unit to store information, said control unit comprising:
    a user instruction accepting unit to accept a protection instruction to protect said information from the user of said portable communication terminal and a cancellation instruction to cancel the protection of said information;
    an authentication unit to authenticate said user of said portable communication terminal;
    an instruction notifying unit to notify said portable communication terminal of said protection instruction and said cancellation instruction when said authentication unit authenticates said user; and
    a providing unit to provide the security program to protect said information on said portable communication terminal,
    wherein said portable communication terminal comprises:
    a receiving unit to receive said protection instruction and said cancellation instruction from said control device;
    an information protecting unit to perform a process of protecting said information according to said protection instruction received by said receiving unit;
    a protection canceling unit to perform a process of canceling the protection of said information according to said cancellation instruction received by said receiving unit;
    a download unit to download said security program from said control device through an Internet;
    a program storage unit to store said security program downloaded by said download unit; and
    an executing unit to execute said security program when said portable communication terminal is activated.

2. The security system according to claim 1, wherein said control device comprises a flag storage unit to coordinate and store an identification information on said portable communication terminal and a process flag showing whether or not a process of protecting said information is performed, wherein said instruction notifying unit of said control device, when notifying said portable communication terminal of said protection instruction and said cancellation instruction, sets and resets said process flag of said identification information on the portable communication terminal in said flag storage unit, said portable communication terminal, comprising:

a referring unit accessing to said flag storage unit of said control device through the Internet and referring to said process flag corresponding to identification information of said portable communication terminal; and a control unit allowing said information protecting unit to perform a process of protecting said information when said process flag is set and allowing said protection canceling unit to perform a process of canceling the protection of said information when said process flag is reset.

3. The security system according to claim 2, wherein said control device comprises:

an application accepting unit to accept an application for utilization of said security program from said portable communication terminal;

a registration accepting unit to accept the registration of said identification information and password on said portable communication terminal when said application accepting unit accepts the application; and a registration terminal storage unit to coordinate and store said password for said each identification information on said portable communication terminal accepted by said registration accepting unit, wherein, in said control device, said user instruction accepting unit accepts, together with said protection instruction and said cancellation instruction, said identification information and said password on the portable communication terminal, wherein said authentication unit accesses to said registration terminal storage unit and determines whether or not said identification information and said password on said portable communication terminal accepted by said user instruction accepting unit are matched, and when matched, authenticates said user of the portable communication terminal.

4. The security system according to claim 1, wherein said control device includes a transmitting unit to transmit a protection instruction mail to said portable communication terminal, and said portable communication terminal comprises a receiving unit to receive said protection instruction mail, and wherein said information protecting unit of said portable communication terminal starts a process of protecting said information when said receiving unit receives said protection instruction mail, and after that, said referring unit periodically refers to said process flag.

5. The security system according to claim 4, wherein said portable communication terminal refers to said protection instruction mail received by said receiving unit, or a title or a text of said cancellation instruction mail, and comprises a determining unit to determine whether or not the mail is a mail to notify said protection instruction or said cancellation instruction, wherein said information protecting unit performs a process of protecting said information when said determining unit determines that said protection instruction is a mail to notify said protection instruction, and wherein said protection canceling unit performs a process of canceling the protection of said information when said determining unit determines that said cancellation instruction is a mail to notify said cancellation instruction.

6. The security system according to claim 1, wherein said control device comprises the transmitting unit to transmit a cancellation instruction mail to said portable communication terminal, wherein said portable communication terminal comprises the receiving unit to receive said cancellation instruction mail, and wherein said protection canceling unit of said portable communication terminal performs a process of canceling said information when said receiving unit receives said cancellation instruction mail.

7. The security system according to claim 1, wherein said user instruction accepting unit receives a phone call from said user of said portable communication terminal through a public circuit network and comprises a voice automatic response device to perform an automatic voice response, wherein said voice automatic response device accepts said protection instruction and said cancellation instruction of said portable communication terminal together with said identification information and said password of the portable communication terminal.

8. The security system according to claim 1, wherein said user instruction accepting unit accepts the input of said identification information and said password of the portable communication terminal from said user of said portable communication terminal through the Internet together with said protection instruction and said cancellation instruction of said portable communication terminal.

9. The security system according to claim 1, wherein said portable communication terminal comprises an operating unit to operate said information, wherein said information protecting unit of said portable communication terminal comprises an operation prohibiting unit to prohibit the operation of said operating unit of the portable communication terminal, and wherein said protection canceling unit of said portable communication terminal comprises a prohibition canceling unit to cancel the operation prohibition of said operating unit of the portable communication terminal.

10. The security system according to claim 9, wherein said information protecting unit of said portable communication terminal performs plural processes of protecting said information, wherein said user instruction accepting unit of said control device accepts which protection process should be performed from among said plural protection processes, and wherein said information protection unit of said mobile phone terminal performs said protection process accepted by said user instruction accepting unit of said control unit.

11. The security system according to claim 1, wherein said portable communication terminal comprises a shutting off unit to automatically shut off power supply of the portable communication terminal, and wherein said information protecting unit of said portable communication terminal allows said shutting off unit of the portable communication terminal to automatically shut off the power supply.

12. The security system according to claim 1, wherein said control device comprises an originating unit to make a phone call from a predetermined phone number to said portable communication terminal when said user instruction accepting unit accepts said protection instruction,
 wherein said portable communication device includes:
  a number storage unit to store said predetermined phone number;
  a terminating unit to receive said phone call;
  an obtaining unit to obtain a phone number received by said terminating unit; and
  a determining unit accessing to said number storage unit and determining whether or not the phone number acquired by said obtaining unit is said predetermined phone number, and
  wherein, when said determining unit determines that the phone number acquired by said obtaining unit is said predetermined phone number, said information protecting unit of said portable communication terminal starts a process of protecting said information.

13. The security system according to claim 1, wherein said control device includes an originating unit to make a phone call from a predetermined phone number to said portable communication terminal when said user instruction accepting unit accepts said protection instruction,
 wherein said portable communication terminal comprises:
  a number storage unit to store said predetermined phone number;
  a terminating unit to receive said phone call;
  an obtaining unit to obtain a phone number received by said terminating unit; and
  a determining unit to determine whether or not the phone number acquired by said obtained unit is said predetermined phone number,
  wherein, when said determining unit determines that the phone number obtained by said obtaining unit is said predetermined phone number, said protection canceling unit of said portable communication terminal cancels said protecting process.

14. The security system according to claim 1,
 wherein said portable communication terminal comprises a Web browser, and
 wherein said portable communication terminal accesses to said control device through said Web browser.

15. The security system according to claim 1,
 wherein said control device comprises:
  a protection process history recording unit to record the process history of the date and time when said user instruction unit accepts said protection instruction and said cancellation instruction; and
  a history exhibiting unit to exhibit said process history recorded in said protection process history recording unit according to a user request.

16. The security system according to claim 15, wherein said control device includes a charging unit to charge an utilization charge for said each user based on said process history recorded in said protection process history recording unit.

17. The security system according to claim 1,
 wherein said control device includes:
  a contract history recording unit to record the date and time of said application for utilization of said security system of the user and the contract history of the date and time when said utilization is cancelled, and
  a charging unit to charge an utilization charge to each user based on said contract history recorded in said contract history recording unit.

18. A security program to protect information in the portable communication terminal comprising an information storage unit to store information,
 said program allowing said portable communication terminal to execute:
  a procedure to communicate with a control device that notifies the protection instruction to protect said information and the cancellation instruction to cancel the protection of said information;
  a procedure to accept said protection instruction from said control device in said communication procedure;
  a procedure to accept said cancellation instruction from said control device in said communication procedure;
  a procedure to perform a process of protecting said information according to said protection instruction; and
  a procedure to perform a process of canceling the protection of said information according to said cancellation instruction, wherein said control device comprises a flag storage unit to coordinate and store identification information on said portable communication terminal and a process flag showing whether or not a process of protecting said information is performed,
 wherein said security program is a security program allowing said portable communication terminal to execute:
  a procedure to access to said flag storage unit of said control device and refer to said process flag of said identification information of the portable communication terminal;
  a procedure to perform a process of protecting said information when said process flat is set; and
  a procedure to perform a process of canceling the protection of said information when said process flag is reset.

19. A security program to protect information in the portable communication terminal comprising an information storage unit to store information,
 said program allowing said portable communication terminal to execute:
  a procedure to communicate with a control device that notifies the protection instruction to protect said information and the cancellation instruction to cancel the protection of said information;
  a procedure to accept said protection instruction from said control device in said communication procedure;
  a procedure to accept said cancellation instruction from said control device in said communication procedure;
  a procedure to perform a process of protecting said information according to said protection instruction; and
  a procedure to perform a process of canceling the protection of said information according to said cancellation instruction, wherein said control device includes a transmitting unit to transmit a protection instruction mail to said portable communication terminal, and
 wherein said security program allows said portable communication terminal to execute:
  a procedure to receive said protection instruction mail;
  a procedure to start a process of protecting said information when said protection instruction mail is received in said receiving procedure; and
  a procedure to periodically refer to said process flag after said starting procedure.

20. A security program to protect information in the portable communication terminal comprising an information storage unit to store information,
 said program allowing said portable communication terminal to execute:
  a procedure to communicate with a control device that notifies the protection instruction to protect said information and the cancellation instruction to cancel the protection of said information;

a procedure to accept said protection instruction from said control device in said communication procedure;

a procedure to accept said cancellation instruction from said control device in said communication procedure;

a procedure to perform a process of protecting said information according to said protection instruction; and a procedure to perform a process of canceling the protection of said information according to said cancellation instruction, wherein said control device includes a transmitting unit to transmit the cancellation instruction mail to said portable communication terminal, and wherein said security program allows said portable communication terminal to execute:

a procedure to receive said cancellation instruction mail; and a procedure to perform a process of canceling the protection of said information when said cancellation instruction mail is received in said receiving procedure.

21. A security program to protect information in the portable communication terminal comprising an information storage unit to store information, said program allowing said portable communication terminal to execute:

a procedure to communicate with a control device that notifies the protection instruction to protect said information and the cancellation instruction to cancel the protection of said information;

a procedure to accept said protection instruction from said control device in said communication procedure;

a procedure to accept said cancellation instruction from said control device in said communication procedure;

a procedure to perform a process of protecting said information according to said protection instruction; and a procedure to perform a process of canceling the protection of said information according to said cancellation instruction, wherein said control device includes an originating unit to make a phone call from the predetermined phone number to said portable communication terminal when said protection instruction is accepted by the procedure to accept said protection instruction, and wherein said portable communication terminal includes a number storage unit to store the predetermined phone number, and wherein said security program allows said portable communication terminal to execute:

a procedure to receive said phone call;

a procedure to obtain the phone number received by said terminating procedure;

a procedure to access to said number storage unit and determine whether or not the phone number acquired by said obtaining procedure is said predetermined phone number; and a procedure in which said information protecting unit of said portable communication terminal starts a process of protecting said information when the phone number acquired by said obtaining procedure is determined to be said predetermined phone number by said determining procedure.

22. A security program to protect information in the portable communication terminal comprising an information storage unit to store information, said program allowing said portable communication terminal to execute:

a procedure to communicate with a control device that notifies the protection instruction to protect said information and the cancellation instruction to cancel the protection of said information;

a procedure to accept said protection instruction from said control device in said communication procedure;

a procedure to accept said cancellation instruction from said control device in said communication procedure;

a procedure to perform a process of protecting said information according to said protection instruction; and a procedure to perform a process of canceling the protection of said information according to said cancellation instruction, wherein said control device includes an originating unit to make a phone call from the predetermined phone number to said portable communication terminal when said user instruction accepting unit accepts said canceling instruction;

wherein said portable communication terminal includes a number storage unit to store said predetermined phone number, and wherein said security program allows said portable communication terminal to execute:

a procedure to receive said phone call;

a procedure to obtain the phone number received by said terminating procedure;

a procedure to determine whether or not the phone number acquired by said obtaining procedure is said predetermined phone number; and a procedure in which said protection canceling unit of said portable communication terminal cancels the process of said protection when the phone number acquired by said obtaining procedure is determined to be said predetermined phone number by said determining procedure.

* * * * *